United States Patent
Di Cristo et al.

(10) Patent No.: US 9,626,959 B2
(45) Date of Patent: *Apr. 18, 2017

(54) SYSTEM AND METHOD OF SUPPORTING ADAPTIVE MISRECOGNITION IN CONVERSATIONAL SPEECH

(71) Applicant: Nuance Communications, Inc., Burlington, MA (US)

(72) Inventors: Philippe Di Cristo, Bellevue, WA (US); Chris Weider, Everett, WA (US); Robert A. Kennewick, Seattle, WA (US)

(73) Assignee: Nuance Communications, Inc., Burlington, MA (US)

( * ) Notice: Subject to any disclaimer, the term of this patent is extended or adjusted under 35 U.S.C. 154(b) by 306 days.

This patent is subject to a terminal disclaimer.

(21) Appl. No.: 14/143,903

(22) Filed: Dec. 30, 2013

(65) Prior Publication Data

US 2014/0108013 A1 Apr. 17, 2014

Related U.S. Application Data

(63) Continuation of application No. 13/022,370, filed on Feb. 7, 2011, now Pat. No. 8,620,659, which is a
(Continued)

(51) Int. Cl.
*G10L 15/22* (2006.01)
*G10L 15/08* (2006.01)
(Continued)

(52) U.S. Cl.
CPC ............ *G10L 15/08* (2013.01); *G06F 17/273* (2013.01); *G10L 15/1815* (2013.01); *G10L 15/22* (2013.01)

(58) Field of Classification Search
CPC ....................................................... G10L 15/22
See application file for complete search history.

(56) References Cited

U.S. PATENT DOCUMENTS

| 4,430,669 A | 2/1984 | Cheung .......................... 358/122 |
| 4,821,027 A | 4/1989 | Mallory et al. ................ 340/521 |

(Continued)

FOREIGN PATENT DOCUMENTS

| EP | 1 320 043 A2 | 6/2003 |
| EP | 1 646 037 | 4/2006 |

(Continued)

OTHER PUBLICATIONS

Reuters, "IBM to Enable Honda Drivers to Talk to Cars", Charles Schwab & Co., Inc., Jul. 28, 2002, 1 page.
(Continued)

*Primary Examiner* — Jialong He
(74) *Attorney, Agent, or Firm* — Wolf, Greenfield & Sacks, P.C.

(57) ABSTRACT

A system and method are provided for receiving speech and/or non-speech communications of natural language questions and/or commands and executing the questions and/or commands. The invention provides a conversational human-machine interface that includes a conversational speech analyzer, a general cognitive model, an environmental model, and a personalized cognitive model to determine context, domain knowledge, and invoke prior information to interpret a spoken utterance or a received non-spoken message. The system and method creates, stores, and uses extensive personal profile information for each user, thereby improving the reliability of determining the context of the speech or non-speech communication and presenting the expected results for a particular question or command.

16 Claims, 9 Drawing Sheets

Related U.S. Application Data continuation of application No. 12/571,795, filed on Oct. 1, 2009, now Pat. No. 8,332,224, which is a continuation of application No. 11/200,164, filed on Aug. 10, 2005, now Pat. No. 7,620,549.

(51) Int. Cl.
*G06F 17/27* (2006.01)
*G10L 15/18* (2013.01)

(56) References Cited

U.S. PATENT DOCUMENTS

| | | | |
|---|---|---|---|
| 4,910,784 A | 3/1990 | Doddington et al. | 381/43 |
| 5,027,406 A | 6/1991 | Roberts et al. | 381/43 |
| 5,155,743 A | 10/1992 | Jacobs | 375/28 |
| 5,164,904 A | 11/1992 | Sumner | 364/436 |
| 5,208,748 A | 5/1993 | Flores et al. | 364/419 |
| 5,274,560 A | 12/1993 | LaRue | 364/444 |
| 5,357,596 A | 10/1994 | Takebayashi et al. | 395/2.84 |
| 5,377,350 A | 12/1994 | Skinner | 395/600 |
| 5,386,556 A | 1/1995 | Hedin et al. | 395/600 |
| 5,424,947 A | 6/1995 | Nagao et al. | 364/419.08 |
| 5,471,318 A | 11/1995 | Ahuja et al. | 358/400 |
| 5,475,733 A | 12/1995 | Eisdorfer et al. | 379/52 |
| 5,488,652 A | 1/1996 | Bielby et al. | 379/88 |
| 5,499,289 A | 3/1996 | Bruno et al. | 379/220 |
| 5,500,920 A | 3/1996 | Kupiec | 395/2.79 |
| 5,517,560 A | 5/1996 | Greenspan | 379/114 |
| 5,533,108 A | 7/1996 | Harris et al. | 379/201 |
| 5,537,436 A | 7/1996 | Bottoms et al. | 375/222 |
| 5,539,744 A | 7/1996 | Chu et al. | 370/60 |
| 5,557,667 A | 9/1996 | Bruno et al. | 379/201 |
| 5,559,864 A | 9/1996 | Kennedy, Jr. | 379/59 |
| 5,563,937 A | 10/1996 | Bruno et al. | 379/201 |
| 5,577,165 A | 11/1996 | Takebayashi et al. | 395/2.84 |
| 5,590,039 A | 12/1996 | Ikeda et al. | 395/759 |
| 5,608,635 A | 3/1997 | Tamai | 364/449.3 |
| 5,617,407 A | 4/1997 | Bareis | 369/275.3 |
| 5,633,922 A | 5/1997 | August et al. | 379/220 |
| 5,652,570 A | 7/1997 | Lepkofker | 340/573 |
| 5,675,629 A | 10/1997 | Raffel et al. | 379/58 |
| 5,696,965 A | 12/1997 | Dedrick | 395/610 |
| 5,708,422 A | 1/1998 | Blonder et al. | 340/825.34 |
| 5,721,938 A | 2/1998 | Stuckey | 395/754 |
| 5,722,084 A | 2/1998 | Chakrin et al. | 455/551 |
| 5,740,256 A | 4/1998 | Castello Da Costa et al. | 361/94.7 |
| 5,742,763 A | 4/1998 | Jones | 395/200.3 |
| 5,748,841 A | 5/1998 | Morin et al. | 395/2.66 |
| 5,748,974 A | 5/1998 | Johnson | 395/759 |
| 5,752,052 A | 5/1998 | Richardson et al. | 395/759 |
| 5,754,784 A | 5/1998 | Garland et al. | 395/200.49 |
| 5,761,631 A | 6/1998 | Nasukawa | 704/9 |
| 5,774,841 A | 6/1998 | Salazar et al. | 704/225 |
| 5,774,859 A | 6/1998 | Houser et al. | 704/275 |
| 5,794,050 A | 8/1998 | Dahlgren et al. | 395/708 |
| 5,794,196 A | 8/1998 | Yegnanarayanan et al. | 704/255 |
| 5,797,112 A | 8/1998 | Komatsu et al. | 701/201 |
| 5,799,276 A | 8/1998 | Komissarchik et al. | 704/251 |
| 5,802,510 A | 9/1998 | Jones | 707/2 |
| 5,832,221 A | 11/1998 | Jones | 375/200.36 |
| 5,839,107 A | 11/1998 | Gupta et al. | 704/270 |
| 5,848,396 A | 12/1998 | Gerace | 705/10 |
| 5,855,000 A | 12/1998 | Waibel et al. | 704/235 |
| 5,867,817 A | 2/1999 | Catallo et al. | 704/255 |
| 5,878,385 A | 3/1999 | Bralich et al. | 704/9 |
| 5,878,386 A | 3/1999 | Coughlin | 704/10 |
| 5,892,813 A | 4/1999 | Morin et al. | 379/88.01 |
| 5,892,900 A | 4/1999 | Ginter et al. | 395/186 |
| 5,895,464 A | 4/1999 | Bhandari et al. | 707/3 |
| 5,895,466 A | 4/1999 | Goldberg et al. | 707/5 |
| 5,897,613 A | 4/1999 | Chan | 704/210 |
| 5,902,347 A | 5/1999 | Backman et al. | 701/200 |
| 5,911,120 A | 6/1999 | Jarett et al. | 455/417 |
| 5,918,222 A | 6/1999 | Fukui et al. | 707/1 |
| 5,926,784 A | 7/1999 | Richardson et al. | 704/9 |
| 5,933,822 A | 8/1999 | Braden-Harder et al. | 707/5 |
| 5,953,393 A | 9/1999 | Culbreth et al. | 379/88.25 |
| 5,960,397 A | 9/1999 | Rahim | 704/244 |
| 5,960,399 A | 9/1999 | Barclay et al. | 704/270 |
| 5,960,447 A | 9/1999 | Holt et al. | 707/500 |
| 5,963,894 A | 10/1999 | Richardson et al. | 704/9 |
| 5,963,940 A | 10/1999 | Liddy et al. | 707/5 |
| 5,987,404 A | 11/1999 | Della Pietra et al. | 704/9 |
| 5,991,721 A | 11/1999 | Asano et al. | 704/257 |
| 5,995,119 A | 11/1999 | Cosatto et al. | 345/473 |
| 5,995,928 A | 11/1999 | Nguyen et al. | 704/251 |
| 6,009,382 A | 12/1999 | Martino et al. | 704/1 |
| 6,014,559 A | 1/2000 | Amin | 455/413 |
| 6,018,708 A | 1/2000 | Dahan et al. | 704/244 |
| 6,021,384 A | 2/2000 | Gorin et al. | 704/1 |
| 6,028,514 A | 2/2000 | Lemelson et al. | 340/539 |
| 6,035,267 A | 3/2000 | Watanabe et al. | 704/1 |
| 6,044,347 A | 3/2000 | Abella et al. | 704/272 |
| 6,049,602 A | 4/2000 | Foladare et al. | 379/265 |
| 6,049,607 A | 4/2000 | Marash et al. | 379/410 |
| 6,058,187 A | 5/2000 | Chen | 380/21 |
| 6,067,513 A | 5/2000 | Ishimitsu | 704/233 |
| 6,076,059 A | 6/2000 | Glickman et al. | 704/260 |
| 6,078,886 A | 6/2000 | Dragosh et al. | 704/270 |
| 6,081,774 A | 6/2000 | De Hita et al. | 704/9 |
| 6,085,186 A | 7/2000 | Christianson et al. | 707/3 |
| 6,101,241 A | 8/2000 | Boyce et al. | 379/88.01 |
| 6,108,631 A | 8/2000 | Ruhl | 704/270 |
| 6,119,087 A | 9/2000 | Kuhn et al. | 704/270 |
| 6,122,613 A | 9/2000 | Baker | 704/235 |
| 6,134,235 A | 10/2000 | Goldman et al. | 370/352 |
| 6,144,667 A | 11/2000 | Doshi et al. | 370/401 |
| 6,144,938 A | 11/2000 | Surace et al. | 704/257 |
| 6,154,526 A | 11/2000 | Dahlke et al. | 379/88.03 |
| 6,160,883 A | 12/2000 | Jackson et al. | 379/230 |
| 6,167,377 A | 12/2000 | Gillick et al. | 704/240 |
| 6,173,266 B1 | 1/2001 | Marx et al. | 704/270 |
| 6,173,279 B1 | 1/2001 | Levin et al. | 707/5 |
| 6,175,858 B1 | 1/2001 | Bulfer et al. | 709/206 |
| 6,185,535 B1 | 2/2001 | Hedin et al. | 704/270 |
| 6,188,982 B1 | 2/2001 | Chiang | 704/256 |
| 6,192,110 B1 | 2/2001 | Abella et al. | 379/88.01 |
| 6,192,338 B1 | 2/2001 | Haszto et al. | 704/257 |
| 6,195,634 B1 | 2/2001 | Dudemaine et al. | 704/231 |
| 6,195,651 B1 | 2/2001 | Handel et al. | 707/2 |
| 6,199,043 B1 | 3/2001 | Happ | 704/272 |
| 6,208,964 B1 | 3/2001 | Sabourin | 704/244 |
| 6,208,972 B1 | 3/2001 | Grant et al. | 704/275 |
| 6,219,346 B1 | 4/2001 | Maxemchuk | 370/338 |
| 6,219,643 B1 | 4/2001 | Cohen et al. | 704/257 |
| 6,226,612 B1 | 5/2001 | Srenger et al. | 704/256 |
| 6,233,556 B1 | 5/2001 | Teunen et al. | 704/250 |
| 6,233,559 B1 | 5/2001 | Balakrishnan | 704/275 |
| 6,233,561 B1 | 5/2001 | Junqua et al. | 704/277 |
| 6,236,968 B1 | 5/2001 | Kanevsky et al. | 704/275 |
| 6,246,981 B1 | 6/2001 | Papineni et al. | 704/235 |
| 6,246,990 B1 | 6/2001 | Happ | 704/275 |
| 6,266,636 B1 | 7/2001 | Kosaka et al. | 704/244 |
| 6,269,336 B1 | 7/2001 | Ladd et al. | 704/270 |
| 6,272,455 B1 | 8/2001 | Hoshen et al. | 704/1 |
| 6,275,231 B1 | 8/2001 | Obradovich | 345/349 |
| 6,278,377 B1 | 8/2001 | DeLine et al. | 340/815.4 |
| 6,278,968 B1 | 8/2001 | Franz et al. | 704/3 |
| 6,288,319 B1 | 9/2001 | Catona | 84/609 |
| 6,292,767 B1 | 9/2001 | Jackson et al. | 704/1 |
| 6,301,560 B1 | 10/2001 | Masters | 704/251 |
| 6,308,151 B1 | 10/2001 | Smith | 704/235 |
| 6,314,402 B1 | 11/2001 | Monaco et al. | 704/275 |
| 6,321,196 B1 | 11/2001 | Franceschi | 704/243 |
| 6,356,869 B1 | 3/2002 | Chapados et al. | 704/275 |
| 6,362,748 B1 | 3/2002 | Huang | 340/901 |
| 6,366,882 B1 | 4/2002 | Bijl et al. | 704/235 |
| 6,366,886 B1 | 4/2002 | Dragosh et al. | 704/270.1 |
| 6,374,214 B1 | 4/2002 | Friedland et al. | 704/235 |
| 6,377,913 B1 | 4/2002 | Coffman et al. | 704/8 |
| 6,381,535 B1 | 4/2002 | Durocher et al. | 701/202 |
| 6,385,596 B1 | 5/2002 | Wiser et al. | 705/51 |
| 6,385,646 B1 | 5/2002 | Brown et al. | 709/217 |

(56) References Cited

U.S. PATENT DOCUMENTS

| | | |
|---|---|---|
| 6,393,403 B1 | 5/2002 | Majaniemi .................... 704/275 |
| 6,393,428 B1 | 5/2002 | Miller et al. ................. 707/102 |
| 6,397,181 B1 | 5/2002 | Li et al. ....................... 704/256 |
| 6,404,878 B1 | 6/2002 | Jackson et al. ........... 379/221.01 |
| 6,405,170 B1 | 6/2002 | Phillips et al. ............... 704/270 |
| 6,408,272 B1 | 6/2002 | White et al. ............... 704/270.1 |
| 6,411,810 B1 | 6/2002 | Maxemchuk ................. 455/453 |
| 6,415,257 B1 | 7/2002 | Junqua et al. ................ 704/275 |
| 6,418,210 B1 | 7/2002 | Sayko ....................... 379/142.15 |
| 6,420,975 B1 | 7/2002 | DeLine et al. .............. 340/815.4 |
| 6,429,813 B2 | 8/2002 | Feigen ...................... 342/357.13 |
| 6,430,285 B1 | 8/2002 | Bauer et al. .............. 379/265.01 |
| 6,430,531 B1 | 8/2002 | Polish ............................ 704/257 |
| 6,434,523 B1 | 8/2002 | Monaco ......................... 704/257 |
| 6,434,524 B1 | 8/2002 | Weber ............................ 704/257 |
| 6,434,529 B1 | 8/2002 | Walker et al. ................ 704/275 |
| 6,442,522 B1 | 8/2002 | Carberry et al. ............. 704/257 |
| 6,446,114 B1 | 9/2002 | Bulfer et al. .................. 709/206 |
| 6,453,153 B1 | 9/2002 | Bowker et al. ............... 455/67.4 |
| 6,453,292 B2 | 9/2002 | Ramaswamy et al. ....... 704/235 |
| 6,456,711 B1 | 9/2002 | Cheung et al. .......... 379/265.09 |
| 6,456,974 B1 | 9/2002 | Baker et al. ................ 704/270.1 |
| 6,466,654 B1 | 10/2002 | Cooper et al. ............ 379/88.01 |
| 6,466,899 B1 | 10/2002 | Yano et al. ....................... 704/1 |
| 6,470,315 B1 | 10/2002 | Netsch et al. ................ 704/256 |
| 6,487,494 B2 | 11/2002 | Odinak et al. ................ 701/202 |
| 6,487,495 B1 | 11/2002 | Gale et al. .................... 701/209 |
| 6,498,797 B1 | 12/2002 | Anerousis et al. ........... 370/522 |
| 6,499,013 B1 | 12/2002 | Weber ............................ 704/257 |
| 6,501,833 B2 | 12/2002 | Phillips et al. ............ 379/88.07 |
| 6,501,834 B1 | 12/2002 | Milewski et al. .......... 379/93.24 |
| 6,505,155 B1 | 1/2003 | Vanbuskirk et al. .......... 704/246 |
| 6,510,417 B1 | 1/2003 | Woods et al. ................. 704/275 |
| 6,513,006 B2 | 1/2003 | Howard et al. ............... 704/257 |
| 6,522,746 B1 | 2/2003 | Marchok et al. ........ 379/406.03 |
| 6,523,061 B1 | 2/2003 | Halverson et al. ........... 709/202 |
| 6,532,444 B1 | 3/2003 | Weber ............................ 704/257 |
| 6,539,348 B1 | 3/2003 | Bond et al. ....................... 704/9 |
| 6,549,629 B2 | 4/2003 | Finn et al. ........................ 381/92 |
| 6,553,372 B1 | 4/2003 | Brassell et al. .................. 707/5 |
| 6,556,970 B1 | 4/2003 | Sasaki et al. ................. 704/257 |
| 6,556,973 B1 | 4/2003 | Lewin ........................... 704/277 |
| 6,560,576 B1 | 5/2003 | Cohen et al. .................. 704/270 |
| 6,560,590 B1 | 5/2003 | Shwe et al. ..................... 706/55 |
| 6,567,778 B1 | 5/2003 | Chao Chang et al. ........ 704/270 |
| 6,567,797 B1 | 5/2003 | Schuetze et al. .................. 707/2 |
| 6,570,555 B1 | 5/2003 | Prevost et al. ................ 345/156 |
| 6,570,964 B1 | 5/2003 | Murveit et al. ............... 379/67.1 |
| 6,571,279 B1 | 5/2003 | Herz et al. .................... 709/217 |
| 6,574,597 B1 | 6/2003 | Mohri et al. .................. 704/251 |
| 6,574,624 B1 | 6/2003 | Johnson et al. .................. 707/5 |
| 6,578,022 B1 | 6/2003 | Foulger et al. ................. 706/45 |
| 6,581,103 B1 | 6/2003 | Dengler ........................ 709/231 |
| 6,584,439 B1 | 6/2003 | Geilhufe et al. .............. 704/270 |
| 6,587,858 B1 | 7/2003 | Strazza ......................... 707/102 |
| 6,591,239 B1 | 7/2003 | McCall et al. ................ 704/275 |
| 6,594,257 B1 | 7/2003 | Doshi et al. .................. 370/352 |
| 6,594,367 B1 | 7/2003 | Marash et al. .................. 381/92 |
| 6,598,018 B1 | 7/2003 | Junqua ........................... 704/251 |
| 6,601,026 B2 | 7/2003 | Appelt et al. ...................... 704/9 |
| 6,604,075 B1 | 8/2003 | Brown et al. ............... 704/270.1 |
| 6,604,077 B2 | 8/2003 | Dragosh et al. ............. 704/270.1 |
| 6,606,598 B1 | 8/2003 | Holthouse et al. ........... 704/275 |
| 6,611,692 B2 | 8/2003 | Raffel et al. .................. 455/552 |
| 6,614,773 B1 | 9/2003 | Maxemchuk .................. 370/337 |
| 6,615,172 B1 | 9/2003 | Bennett et al. ................ 704/257 |
| 6,622,119 B1 | 9/2003 | Ramaswamy et al. ........... 704/9 |
| 6,629,066 B1 | 9/2003 | Jackson et al. .................... 704/9 |
| 6,631,346 B1 | 10/2003 | Karaorman et al. .............. 704/9 |
| 6,631,351 B1 | 10/2003 | Ramachandran et al. .... 704/270 |
| 6,633,846 B1 | 10/2003 | Bennett et al. ................ 704/257 |
| 6,636,790 B1 | 10/2003 | Lightner et al. ................ 701/33 |
| 6,643,620 B1 | 11/2003 | Contolini et al. ............. 704/270 |
| 6,650,747 B1 | 11/2003 | Bala et al. .................. 379/265.06 |
| 6,658,388 B1 | 12/2003 | Kleindienst et al. .......... 704/275 |
| 6,678,680 B1 | 1/2004 | Woo .................................. 707/6 |
| 6,681,206 B1 | 1/2004 | Gorin et al. ................... 704/243 |
| 6,691,151 B1 | 2/2004 | Cheyer et al. ................. 709/202 |
| 6,701,294 B1 | 3/2004 | Ball et al. ...................... 704/257 |
| 6,704,396 B2 | 3/2004 | Parolkar et al. ............ 379/88.17 |
| 6,704,576 B1 | 3/2004 | Brachman et al. ............ 455/503 |
| 6,704,708 B1 | 3/2004 | Pickering ...................... 704/235 |
| 6,708,150 B1 | 3/2004 | Hirayama et al. ............ 704/243 |
| 6,721,001 B1 | 4/2004 | Berstis ......................... 348/231.3 |
| 6,721,706 B1 | 4/2004 | Strubbe et al. ................ 704/275 |
| 6,735,592 B1 | 5/2004 | Neumann et al. ............. 707/101 |
| 6,739,556 B1 | 5/2004 | Langston ....................... 244/189 |
| 6,741,931 B1 | 5/2004 | Kohut et al. .................. 701/209 |
| 6,742,021 B1 | 5/2004 | Halverson et al. ........... 709/218 |
| 6,745,161 B1 | 6/2004 | Arnold et al. ..................... 704/7 |
| 6,751,591 B1 | 6/2004 | Gorin et al. ................... 704/257 |
| 6,751,612 B1 | 6/2004 | Schuetze et al. .................. 707/4 |
| 6,754,485 B1 | 6/2004 | Obradovich et al. ....... 455/414.1 |
| 6,754,627 B2 | 6/2004 | Woodward .................... 704/235 |
| 6,757,544 B2 | 6/2004 | Rangarajan et al. ....... 455/456.1 |
| 6,757,718 B1 | 6/2004 | Halverson et al. ........... 709/218 |
| 6,795,808 B1 | 9/2004 | Strubbe et al. ................ 704/275 |
| 6,801,604 B2 | 10/2004 | Maes et al. ................. 379/88.17 |
| 6,801,893 B1 | 10/2004 | Backfried et al. ............ 704/257 |
| 6,813,341 B1 | 11/2004 | Mahoney ..................... 379/88.01 |
| 6,829,603 B1 | 12/2004 | Chai et al. ........................ 707/5 |
| 6,832,230 B1 | 12/2004 | Zilliacus et al. .............. 707/203 |
| 6,833,848 B1 | 12/2004 | Wolff et al. ................... 345/719 |
| 6,850,603 B1 | 2/2005 | Eberle et al. ............... 379/88.16 |
| 6,856,990 B2 | 2/2005 | Barile et al. ..................... 707/10 |
| 6,865,481 B2 | 3/2005 | Kawazoe et al. ............. 701/211 |
| 6,868,380 B2 | 3/2005 | Kroeker ........................ 704/240 |
| 6,868,385 B1 | 3/2005 | Gerson .......................... 704/275 |
| 6,873,837 B1 | 3/2005 | Yoshioka et al. ............. 455/321 |
| 6,877,001 B2 | 4/2005 | Wolf et al. ......................... 707/3 |
| 6,877,134 B1 | 4/2005 | Fuller et al. ................ 715/500.1 |
| 6,901,366 B1 | 5/2005 | Kuhn et al. ................... 704/275 |
| 6,910,003 B1 | 6/2005 | Arnold et al. ..................... 704/4 |
| 6,912,498 B2 | 6/2005 | Stevens et al. ................ 704/235 |
| 6,934,756 B2 | 8/2005 | Maes ............................. 709/227 |
| 6,937,977 B2 | 8/2005 | Gerson .......................... 704/201 |
| 6,937,982 B2 | 8/2005 | Kitaoka et al. ................ 704/252 |
| 6,944,594 B2 | 9/2005 | Busayapongchai et al. . 704/275 |
| 6,950,821 B2 | 9/2005 | Faybishenko et al. ......... 707/10 |
| 6,954,755 B2 | 10/2005 | Reisman ......................... 707/10 |
| 6,959,276 B2 | 10/2005 | Droppo et al. ................ 704/226 |
| 6,961,700 B2 | 11/2005 | Mitchell et al. ............... 704/235 |
| 6,968,311 B2 | 11/2005 | Knockeart et al. ............ 704/270 |
| 6,973,387 B2 | 12/2005 | Masclet et al. ................ 701/211 |
| 6,975,993 B1 | 12/2005 | Keiller ........................... 704/275 |
| 6,980,092 B2 | 12/2005 | Turnbull et al. ............. 340/425.5 |
| 6,983,055 B2 | 1/2006 | Luo ................................ 381/313 |
| 6,990,513 B2 | 1/2006 | Belfiore et al. ............... 709/203 |
| 6,996,531 B2 | 2/2006 | Korall et al. .................. 704/270 |
| 7,003,463 B1 | 2/2006 | Maes et al. ................. 704/270.1 |
| 7,016,849 B2 | 3/2006 | Arnold et al. ................. 704/275 |
| 7,020,609 B2 | 3/2006 | Thrift et al. ................. 704/270.1 |
| 7,024,364 B2 | 4/2006 | Guerra et al. ................. 704/270 |
| 7,027,586 B2 | 4/2006 | Bushey et al. ............ 379/265.09 |
| 7,027,975 B1 | 4/2006 | Pazandak et al. ................. 704/9 |
| 7,035,415 B2 | 4/2006 | Belt et al. ......................... 381/92 |
| 7,036,128 B1 | 4/2006 | Julia et al. ..................... 719/317 |
| 7,043,425 B2 | 5/2006 | Pao ................................ 704/211 |
| 7,054,817 B2 | 5/2006 | Shao ............................. 704/270 |
| 7,058,890 B2 | 6/2006 | George et al. ................. 715/728 |
| 7,062,488 B1 | 6/2006 | Reisman .......................... 707/8 |
| 7,069,220 B2 | 6/2006 | Coffman et al. .............. 704/275 |
| 7,072,834 B2 | 7/2006 | Zhou ............................. 704/244 |
| 7,082,469 B2 | 7/2006 | Gold et al. .................... 709/231 |
| 7,085,708 B2 | 8/2006 | Manson ............................ 704/9 |
| 7,092,928 B1 | 8/2006 | Elad et al. ....................... 706/60 |
| 7,107,210 B2 | 9/2006 | Deng et al. .................... 704/226 |
| 7,107,218 B1 | 9/2006 | Preston ......................... 704/270 |
| 7,110,951 B1 | 9/2006 | Lemelson et al. ............ 704/270 |
| 7,127,400 B2 | 10/2006 | Koch ........................... 704/270.1 |
| 7,130,390 B2 | 10/2006 | Abburi ........................ 379/88.17 |
| 7,136,875 B2 | 11/2006 | Anderson et al. .......... 707/104.1 |
| 7,137,126 B1 | 11/2006 | Coffman et al. .............. 719/328 |
| 7,143,037 B1 | 11/2006 | Chestnut ....................... 704/251 |

(56) References Cited

U.S. PATENT DOCUMENTS

| | | | |
|---|---|---|---|
| 7,143,039 B1 | 11/2006 | Stifelman et al. | 704/270 |
| 7,146,319 B2 | 12/2006 | Hunt | 704/254 |
| 7,149,696 B2 | 12/2006 | Shimizu et al. | 705/1 |
| 7,165,028 B2 | 1/2007 | Gong | 704/233 |
| 7,177,798 B2 | 2/2007 | Hsu et al. | 704/9 |
| 7,184,957 B2 | 2/2007 | Brookes et al. | 704/246 |
| 7,190,770 B2 | 3/2007 | Ando et al. | 379/88.01 |
| 7,197,069 B2 | 3/2007 | Agazzi et al. | 375/233 |
| 7,197,460 B1 | 3/2007 | Gupta et al. | 704/270.1 |
| 7,203,644 B2 | 4/2007 | Anderson et al. | 704/246 |
| 7,206,418 B2 | 4/2007 | Yang et al. | 381/92 |
| 7,207,011 B2 | 4/2007 | Mulvey et al. | 715/812 |
| 7,215,941 B2 | 5/2007 | Beckmann et al. | 455/404.1 |
| 7,228,276 B2 | 6/2007 | Omote et al. | 704/243 |
| 7,231,343 B1 | 6/2007 | Treadgold et al. | 704/9 |
| 7,236,923 B1 | 6/2007 | Gupta | 704/9 |
| 7,254,482 B2 | 8/2007 | Kawasaki et al. | 701/211 |
| 7,272,212 B2 | 9/2007 | Eberle et al. | 379/88.17 |
| 7,277,854 B2 | 10/2007 | Bennett et al. | 704/257 |
| 7,283,829 B2 | 10/2007 | Christenson et al. | 455/461 |
| 7,283,951 B2 | 10/2007 | Marchisio et al. | 704/9 |
| 7,289,606 B2 | 10/2007 | Sibal et al. | 379/52 |
| 7,299,186 B2 | 11/2007 | Kuzunuki et al. | 704/270.1 |
| 7,301,093 B2 | 11/2007 | Sater et al. | 84/615 |
| 7,305,381 B1 | 12/2007 | Poppink et al. | |
| 7,321,850 B2 | 1/2008 | Wakita | 704/10 |
| 7,328,155 B2 | 2/2008 | Endo et al. | 704/251 |
| 7,337,116 B2 | 2/2008 | Charlesworth et al. | 704/254 |
| 7,340,040 B1 | 3/2008 | Saylor et al. | 379/67.1 |
| 7,366,285 B2 | 4/2008 | Parolkar et al. | 379/88.17 |
| 7,366,669 B2 | 4/2008 | Nishitani et al. | 704/256 |
| 7,376,645 B2 | 5/2008 | Bernard | 707/3 |
| 7,386,443 B1 | 6/2008 | Parthasarathy et al. | 704/201 |
| 7,398,209 B2 | 7/2008 | Kennewick et al. | 704/255 |
| 7,406,421 B2 | 7/2008 | Odinak et al. | 704/275 |
| 7,415,414 B2 | 8/2008 | Azara et al. | 704/270 |
| 7,421,393 B1 | 9/2008 | Di Fabbrizio et al. | 704/275 |
| 7,424,431 B2 | 9/2008 | Greene et al. | 704/270 |
| 7,447,635 B1 | 11/2008 | Konopka et al. | 704/275 |
| 7,451,088 B1 | 11/2008 | Ehlen et al. | 704/270.1 |
| 7,454,608 B2 | 11/2008 | Gopalakrishnan et al. | 713/100 |
| 7,461,059 B2 | 12/2008 | Richardson et al. | 707/5 |
| 7,472,020 B2 | 12/2008 | Brulle-Drews | 701/211 |
| 7,472,060 B1 | 12/2008 | Gorin et al. | 704/240 |
| 7,472,075 B2 | 12/2008 | Odinak et al. | 705/26 |
| 7,478,036 B2 | 1/2009 | Shen et al. | 704/9 |
| 7,487,088 B1 | 2/2009 | Gorin et al. | 704/240 |
| 7,487,110 B2 | 2/2009 | Bennett et al. | 705/26 |
| 7,493,259 B2 | 2/2009 | Jones et al. | 704/257 |
| 7,493,559 B1 | 2/2009 | Wolff et al. | 715/727 |
| 7,502,672 B1 | 3/2009 | Kolls | 701/29 |
| 7,502,738 B2 | 3/2009 | Kennewick et al. | 704/257 |
| 7,516,076 B2 | 4/2009 | Walker et al. | 704/275 |
| 7,529,675 B2 | 5/2009 | Maes | 704/270.1 |
| 7,536,297 B2 | 5/2009 | Byrd et al. | 704/10 |
| 7,536,374 B2 | 5/2009 | Au | 706/55 |
| 7,542,894 B2 | 6/2009 | Murata | 704/9 |
| 7,546,382 B2 | 6/2009 | Healey et al. | 709/246 |
| 7,558,730 B2 | 7/2009 | Davis et al. | 704/235 |
| 7,574,362 B2 | 8/2009 | Walker et al. | 704/275 |
| 7,577,244 B2 | 8/2009 | Taschereau | 379/218.01 |
| 7,606,708 B2 | 10/2009 | Hwang | 704/257 |
| 7,620,549 B2 | 11/2009 | Di Cristo et al. | 704/257 |
| 7,634,409 B2 | 12/2009 | Kennewick et al. | 704/257 |
| 7,640,006 B2 | 12/2009 | Portman et al. | 455/412.1 |
| 7,640,160 B2 | 12/2009 | Di Cristo et al. | 704/257 |
| 7,640,272 B2 | 12/2009 | Mahajan et al. | 707/104.1 |
| 7,676,365 B2 | 3/2010 | Hwang et al. | 704/240 |
| 7,676,369 B2 | 3/2010 | Fujimoto et al. | 704/270 |
| 7,684,977 B2 | 3/2010 | Morikawa | 704/211 |
| 7,693,720 B2 | 4/2010 | Kennewick et al. | 704/275 |
| 7,729,916 B2 | 6/2010 | Coffman et al. | 704/270 |
| 7,729,918 B2 | 6/2010 | Walker et al. | 704/275 |
| 7,729,920 B2 | 6/2010 | Chaar et al. | 704/275 |
| 7,734,287 B2 | 6/2010 | Ying | 455/423 |
| 7,748,021 B2 | 6/2010 | Obradovich | 725/105 |
| 7,788,084 B2 | 8/2010 | Brun et al. | 704/7 |
| 7,801,731 B2 | 9/2010 | Odinak et al. | 704/275 |
| 7,809,570 B2 | 10/2010 | Kennewick et al. | 704/257 |
| 7,818,176 B2 | 10/2010 | Freeman et al. | 704/270 |
| 7,831,426 B2 | 11/2010 | Bennett | 704/252 |
| 7,831,433 B1 | 11/2010 | Belvin et al. | 704/275 |
| 7,873,519 B2 | 1/2011 | Bennett | 704/257 |
| 7,873,523 B2 | 1/2011 | Potter et al. | 704/275 |
| 7,873,654 B2 | 1/2011 | Bernard | 707/769 |
| 7,881,936 B2 | 2/2011 | Longe et al. | 704/257 |
| 7,890,324 B2 | 2/2011 | Bangalore et al. | 704/231 |
| 7,894,849 B2 | 2/2011 | Kass et al. | 455/550.1 |
| 7,902,969 B2 | 3/2011 | Obradovich | 340/439 |
| 7,917,367 B2 | 3/2011 | Di Cristo et al. | 704/270.1 |
| 7,920,682 B2 | 4/2011 | Byrne et al. | 379/88.18 |
| 7,949,529 B2 | 5/2011 | Weider et al. | 704/270 |
| 7,949,537 B2 | 5/2011 | Walker et al. | 704/275 |
| 7,953,732 B2 | 5/2011 | Frank et al. | 707/724 |
| 7,974,875 B1 | 7/2011 | Quilici et al. | 705/14.4 |
| 7,983,917 B2 | 7/2011 | Kennewick et al. | 704/257 |
| 7,984,287 B2 | 7/2011 | Gopalakrishnan et al. | 713/100 |
| 8,005,683 B2 | 8/2011 | Tessel et al. | 704/275 |
| 8,015,006 B2 | 9/2011 | Kennewick et al. | 704/236 |
| 8,060,367 B2 | 11/2011 | Keaveney | 704/247 |
| 8,069,046 B2 | 11/2011 | Kennewick et al. | 704/257 |
| 8,073,681 B2 | 12/2011 | Baldwin et al. | 704/9 |
| 8,077,975 B2 | 12/2011 | Ma et al. | 382/187 |
| 8,082,153 B2 | 12/2011 | Coffman et al. | 704/270 |
| 8,086,463 B2 | 12/2011 | Ativanichayaphong et al. | 704/275 |
| 8,112,275 B2 | 2/2012 | Kennewick et al. | 704/240 |
| 8,140,327 B2 | 3/2012 | Kennewick et al. | 704/226 |
| 8,140,335 B2 | 3/2012 | Kennewick et al. | 704/257 |
| 8,145,489 B2 | 3/2012 | Freeman et al. | 704/257 |
| 8,150,694 B2 | 4/2012 | Kennewick et al. | 704/257 |
| 8,155,962 B2 | 4/2012 | Kennewick et al. | 704/257 |
| 8,170,867 B2 | 5/2012 | Germain | 704/9 |
| 8,195,468 B2 | 6/2012 | Weider et al. | 704/275 |
| 8,219,399 B2 | 7/2012 | Lutz et al. | 704/270 |
| 8,219,599 B2 | 7/2012 | Tunstall-Pedoe | 707/955 |
| 8,224,652 B2 | 7/2012 | Wang et al. | 704/275 |
| 8,255,224 B2 | 8/2012 | Singleton et al. | 704/275 |
| 8,326,627 B2 | 12/2012 | Kennewick et al. | 704/257 |
| 8,326,634 B2 | 12/2012 | Di Cristo et al. | 704/270.1 |
| 8,326,637 B2 | 12/2012 | Baldwin et al. | 704/275 |
| 8,332,224 B2 | 12/2012 | Di Cristo et al. | 704/257 |
| 8,370,147 B2 | 2/2013 | Kennewick et al. | 704/257 |
| 8,447,607 B2 | 5/2013 | Weider et al. | 704/250 |
| 8,452,598 B2 | 5/2013 | Kennewick et al. | 704/257 |
| 8,515,765 B2 | 8/2013 | Baldwin et al. | 704/275 |
| 8,527,274 B2 | 9/2013 | Freeman et al. | 704/257 |
| 8,589,161 B2 | 11/2013 | Kennewick et al. | 704/252 |
| 2001/0041980 A1 | 11/2001 | Howard et al. | 704/270 |
| 2001/0049601 A1 | 12/2001 | Kroeker et al. | 704/254 |
| 2001/0054087 A1 | 12/2001 | Flom et al. | 709/218 |
| 2002/0015500 A1 | 2/2002 | Belt et al. | 381/66 |
| 2002/0022927 A1 | 2/2002 | Lemelson et al. | 701/301 |
| 2002/0029261 A1 | 3/2002 | Shibata | 709/219 |
| 2002/0032752 A1 | 3/2002 | Gold et al. | 709/218 |
| 2002/0035501 A1 | 3/2002 | Handel et al. | 705/10 |
| 2002/0049535 A1 | 4/2002 | Rigo et al. | 701/211 |
| 2002/0049805 A1 | 4/2002 | Yamada et al. | 709/202 |
| 2002/0065568 A1 | 5/2002 | Silfvast et al. | 700/94 |
| 2002/0067839 A1 | 6/2002 | Heinrich | 381/110 |
| 2002/0069059 A1 | 6/2002 | Smith | 704/257 |
| 2002/0069071 A1 | 6/2002 | Knockeart et al. | 704/275 |
| 2002/0082911 A1 | 6/2002 | Dunn et al. | 705/14 |
| 2002/0087326 A1 | 7/2002 | Lee et al. | 704/270.1 |
| 2002/0087525 A1 | 7/2002 | Abbott et al. | 707/3 |
| 2002/0107694 A1 | 8/2002 | Lerg | 704/273 |
| 2002/0120609 A1 | 8/2002 | Lang et al. | 707/1 |
| 2002/0124050 A1 | 9/2002 | Middeljans | 709/203 |
| 2002/0133402 A1 | 9/2002 | Faber et al. | 705/14 |
| 2002/0138248 A1 | 9/2002 | Corston-Oliver et al. | 704/1 |
| 2002/0143532 A1 | 10/2002 | McLean et al. | 704/235 |
| 2002/0143535 A1 | 10/2002 | Kist et al. | 704/251 |
| 2002/0161646 A1 | 10/2002 | Gailey et al. | 705/14 |
| 2002/0173961 A1 | 11/2002 | Guerra | 704/258 |

(56) References Cited

U.S. PATENT DOCUMENTS

| | | | |
|---|---|---|---|
| 2002/0184373 A1 | 12/2002 | Maes | 709/228 |
| 2002/0188602 A1 | 12/2002 | Stubler et al. | 707/3 |
| 2002/0198714 A1 | 12/2002 | Zhou | 704/252 |
| 2003/0014261 A1 | 1/2003 | Kageyama | 704/275 |
| 2003/0016835 A1 | 1/2003 | Elko et al. | 381/92 |
| 2003/0046346 A1 | 3/2003 | Mumick et al. | 709/205 |
| 2003/0064709 A1 | 4/2003 | Gailey et al. | 455/412 |
| 2003/0065427 A1 | 4/2003 | Funk et al. | 701/1 |
| 2003/0088421 A1 | 5/2003 | Maes et al. | 704/270.1 |
| 2003/0097249 A1 | 5/2003 | Walker et al. | 704/1 |
| 2003/0110037 A1 | 6/2003 | Walker et al. | 704/257 |
| 2003/0112267 A1 | 6/2003 | Belrose | 345/728 |
| 2003/0115062 A1 | 6/2003 | Walker et al. | 704/258 |
| 2003/0120493 A1 | 6/2003 | Gupta | 704/270.1 |
| 2003/0135488 A1 | 7/2003 | Amir et al. | 707/3 |
| 2003/0144846 A1 | 7/2003 | Denenberg et al. | 704/277 |
| 2003/0158731 A1 | 8/2003 | Falcon et al. | 704/231 |
| 2003/0161448 A1 | 8/2003 | Parolkar et al. | 379/88.17 |
| 2003/0182132 A1 | 9/2003 | Niemoeller | 704/275 |
| 2003/0204492 A1 | 10/2003 | Wolf et al. | 707/3 |
| 2003/0206640 A1 | 11/2003 | Malvar et al. | 381/93 |
| 2003/0212550 A1 | 11/2003 | Ubale | 704/215 |
| 2003/0212558 A1 | 11/2003 | Matula | 704/260 |
| 2003/0212562 A1 | 11/2003 | Patel et al. | 704/275 |
| 2003/0225825 A1 | 12/2003 | Healey et al. | 709/203 |
| 2003/0236664 A1 | 12/2003 | Sharma | 704/251 |
| 2004/0006475 A1 | 1/2004 | Ehlen et al. | 704/270.1 |
| 2004/0025115 A1 | 2/2004 | Sienel et al. | 715/513 |
| 2004/0044516 A1 | 3/2004 | Kennewick et al. | 704/5 |
| 2004/0098245 A1 | 5/2004 | Walker et al. | 704/1 |
| 2004/0117179 A1 | 6/2004 | Balasuriya | 704/231 |
| 2004/0117804 A1 | 6/2004 | Scahill et al. | 719/320 |
| 2004/0122673 A1* | 6/2004 | Park et al. | 704/270 |
| 2004/0140989 A1 | 7/2004 | Papageorge | 345/700 |
| 2004/0158555 A1 | 8/2004 | Seedman et al. | 707/3 |
| 2004/0166832 A1 | 8/2004 | Portman et al. | 455/412.1 |
| 2004/0167771 A1 | 8/2004 | Duan et al. | 704/10 |
| 2004/0193408 A1 | 9/2004 | Hunt | 704/209 |
| 2004/0193420 A1 | 9/2004 | Kennewick et al. | 704/257 |
| 2004/0199375 A1 | 10/2004 | Ehsani et al. | 704/4 |
| 2004/0205671 A1 | 10/2004 | Sukehiro et al. | 715/532 |
| 2004/0243417 A9 | 12/2004 | Pitts, III et al. | 704/276 |
| 2005/0015256 A1 | 1/2005 | Kargman | 704/272 |
| 2005/0021334 A1 | 1/2005 | Iwahashi | 704/240 |
| 2005/0021470 A1 | 1/2005 | Martin et al. | 705/51 |
| 2005/0021826 A1 | 1/2005 | Kumar | 709/232 |
| 2005/0033574 A1* | 2/2005 | Kim et al. | 704/251 |
| 2005/0043940 A1 | 2/2005 | Elder | 704/9 |
| 2005/0114116 A1 | 5/2005 | Fiedler | 704/201 |
| 2005/0125232 A1 | 6/2005 | Gadd | 704/270.1 |
| 2005/0137850 A1 | 6/2005 | Odell | 704/4 |
| 2005/0137877 A1 | 6/2005 | Oesterling et al. | 704/275 |
| 2005/0143994 A1 | 6/2005 | Mori et al. | 704/235 |
| 2005/0216254 A1 | 9/2005 | Gupta et al. | 704/9 |
| 2005/0234727 A1 | 10/2005 | Chiu | 704/270.1 |
| 2005/0246174 A1 | 11/2005 | DeGolia | 704/270 |
| 2005/0283752 A1 | 12/2005 | Fruchter et al. | 717/100 |
| 2006/0041431 A1 | 2/2006 | Maes | 704/270.1 |
| 2006/0047509 A1 | 3/2006 | Ding et al. | 704/231 |
| 2006/0206310 A1 | 9/2006 | Ravikumar et al. | 704/9 |
| 2006/0217133 A1 | 9/2006 | Christenson et al. | 455/461 |
| 2006/0285662 A1 | 12/2006 | Yin et al. | 379/88.16 |
| 2007/0033005 A1 | 2/2007 | Cristo et al. | 704/9 |
| 2007/0033020 A1 | 2/2007 | Francois et al. | 704/226 |
| 2007/0038436 A1 | 2/2007 | Cristo et al. | 704/9 |
| 2007/0043574 A1 | 2/2007 | Coffman et al. | 704/275 |
| 2007/0043868 A1 | 2/2007 | Kumar et al. | 709/226 |
| 2007/0050191 A1 | 3/2007 | Weider et al. | 704/275 |
| 2007/0055525 A1 | 3/2007 | Kennewick et al. | 704/257 |
| 2007/0061067 A1 | 3/2007 | Zeinstra et al. | 701/200 |
| 2007/0061735 A1 | 3/2007 | Hoffberg et al. | 715/744 |
| 2007/0073544 A1 | 3/2007 | Millett et al. | 704/277 |
| 2007/0078708 A1 | 4/2007 | Yu et al. | 705/14 |
| 2007/0078709 A1 | 4/2007 | Rajaram | 705/14 |
| 2007/0118357 A1 | 5/2007 | Kasravi et al. | 704/10 |
| 2007/0135101 A1 | 6/2007 | Ramati et al. | 455/414.1 |
| 2007/0146833 A1 | 6/2007 | Satomi et al. | 358/537 |
| 2007/0162296 A1 | 7/2007 | Altberg et al. | 705/1 |
| 2007/0179778 A1 | 8/2007 | Gong et al. | 704/9 |
| 2007/0186165 A1 | 8/2007 | Maislos et al. | 715/728 |
| 2007/0198267 A1 | 8/2007 | Jones et al. | 704/257 |
| 2007/0214182 A1 | 9/2007 | Rosenberg | 707/104.1 |
| 2007/0250901 A1 | 10/2007 | McIntire et al. | 725/146 |
| 2007/0265850 A1 | 11/2007 | Kennewick et al. | 704/257 |
| 2007/0299824 A1 | 12/2007 | Pan et al. | 707/3 |
| 2008/0034032 A1 | 2/2008 | Healey et al. | 709/203 |
| 2008/0065386 A1 | 3/2008 | Cross et al. | 704/270 |
| 2008/0091406 A1 | 4/2008 | Baldwin et al. | 704/4 |
| 2008/0103761 A1 | 5/2008 | Printz et al. | 704/9 |
| 2008/0109285 A1 | 5/2008 | Reuther et al. | 705/7 |
| 2008/0115163 A1 | 5/2008 | Gilboa et al. | 725/34 |
| 2008/0133215 A1 | 6/2008 | Sarukkai | 704/2 |
| 2008/0140385 A1 | 6/2008 | Mahajan et al. | 704/9 |
| 2008/0147410 A1 | 6/2008 | Odinak | 704/270.1 |
| 2008/0177530 A1 | 7/2008 | Cross et al. | 704/4 |
| 2008/0189110 A1 | 8/2008 | Freeman et al. | 704/251 |
| 2008/0235023 A1 | 9/2008 | Kennewick et al. | 704/257 |
| 2008/0235027 A1 | 9/2008 | Cross | 704/270.1 |
| 2008/0319751 A1 | 12/2008 | Kennewick et al. | 704/257 |
| 2009/0052635 A1 | 2/2009 | Jones et al. | 379/88.02 |
| 2009/0067599 A1 | 3/2009 | Agarwal et al. | 379/114.21 |
| 2009/0076827 A1 | 3/2009 | Bulitta et al. | 704/275 |
| 2009/0106029 A1 | 4/2009 | DeLine et al. | 704/275 |
| 2009/0117885 A1 | 5/2009 | Roth | 455/414.3 |
| 2009/0144271 A1 | 6/2009 | Richardson et al. | 707/5 |
| 2009/0150156 A1 | 6/2009 | Kennewick et al. | 704/257 |
| 2009/0171664 A1 | 7/2009 | Kennewick et al. | 704/257 |
| 2009/0216540 A1 | 8/2009 | Tessel et al. | 704/275 |
| 2009/0271194 A1 | 10/2009 | Davis et al. | 704/235 |
| 2009/0273563 A1 | 11/2009 | Pryor | 345/157 |
| 2009/0276700 A1 | 11/2009 | Anderson et al. | 715/700 |
| 2009/0299745 A1 | 12/2009 | Kennewick et al. | 704/257 |
| 2009/0307031 A1 | 12/2009 | Winkler et al. | 705/7 |
| 2009/0313026 A1 | 12/2009 | Coffman et al. | 704/275 |
| 2010/0023320 A1 | 1/2010 | Di Cristo et al. | 704/9 |
| 2010/0029261 A1 | 2/2010 | Mikkelsen et al. | 455/419 |
| 2010/0036967 A1 | 2/2010 | Caine et al. | 709/236 |
| 2010/0049501 A1 | 2/2010 | Kennewick et al. | 704/9 |
| 2010/0049514 A1 | 2/2010 | Kennewick et al. | 704/233 |
| 2010/0057443 A1 | 3/2010 | Di Cristo et al. | 704/9 |
| 2010/0063880 A1 | 3/2010 | Atsmon et al. | 705/14.53 |
| 2010/0145700 A1 | 6/2010 | Kennewick et al. | 704/257 |
| 2010/0185512 A1 | 7/2010 | Borger et al. | 705/14.49 |
| 2010/0204986 A1 | 8/2010 | Kennewick et al. | 704/226 |
| 2010/0204994 A1 | 8/2010 | Kennewick et al. | 704/257 |
| 2010/0217604 A1 | 8/2010 | Baldwin et al. | 704/275 |
| 2010/0286985 A1 | 11/2010 | Kennewick et al. | 704/257 |
| 2010/0299142 A1 | 11/2010 | Freeman et al. | 704/9 |
| 2010/0312566 A1 | 12/2010 | Odinak et al. | 704/275 |
| 2011/0112827 A1 | 5/2011 | Kennewick et al. | 704/9 |
| 2011/0112921 A1 | 5/2011 | Kennewick et al. | 705/26.1 |
| 2011/0131036 A1 | 6/2011 | Di Cristo et al. | 704/9 |
| 2011/0131045 A1 | 6/2011 | Cristo et al. | 704/249 |
| 2011/0231182 A1 | 9/2011 | Weider et al. | 704/9 |
| 2011/0231188 A1 | 9/2011 | Kennewick et al. | 704/236 |
| 2012/0022857 A1 | 1/2012 | Baldwin et al. | 704/9 |
| 2012/0101809 A1 | 4/2012 | Kennewick et al. | 704/9 |
| 2012/0101810 A1 | 4/2012 | Kennewick et al. | 704/9 |
| 2012/0109753 A1 | 5/2012 | Kennewick et al. | 705/14.58 |
| 2012/0150636 A1 | 6/2012 | Freeman et al. | 705/14.49 |
| 2012/0278073 A1 | 11/2012 | Weider et al. | 704/235 |
| 2013/0054228 A1 | 2/2013 | Baldwin et al. | 704/9 |
| 2013/0211710 A1 | 8/2013 | Kennewick et al. | 701/419 |
| 2013/0253929 A1 | 9/2013 | Weider et al. | 704/235 |
| 2013/0297293 A1 | 11/2013 | Di Cristo et al. | 704/9 |
| 2013/0304473 A1 | 11/2013 | Baldwin et al. | 704/257 |

FOREIGN PATENT DOCUMENTS

| | | |
|---|---|---|
| WO | WO 99/46763 | 9/1999 |
| WO | WO 00/21232 | 4/2000 |
| WO | WO 00/46792 | 8/2000 |
| WO | WO 01/78065 | 10/2001 |
| WO | WO 2004/072954 | 8/2004 |

(56) References Cited

FOREIGN PATENT DOCUMENTS

| WO | WO 2007/019318 | 2/2007 |
|---|---|---|
| WO | WO 2007/021587 | 2/2007 |
| WO | WO 2007/027546 | 3/2007 |
| WO | WO 2007/027989 | 3/2007 |
| WO | WO 2008/098039 | 8/2008 |
| WO | WO 2008/118195 | 10/2008 |
| WO | WO 2009/075912 | 6/2009 |
| WO | WO 2009/145796 | 12/2009 |
| WO | WO 2010/096752 | 8/2010 |

OTHER PUBLICATIONS

Lin, Bor-shen, et al., "A Distributed Architecture for Cooperative Spoken Dialogue Agents with Coherent Dialogue State and History", ASRU'99, 1999, 4 pages.

Kuhn, Thomas, et al., "Hybrid In-Car Speech Recognition for Mobile Multimedia Applications", Vehicular Technology Conference, IEEE, Jul. 1999, pp. 2009-2013.

Belvin, Robert, et al., "Development of the HRL Route Navigation Dialogue System", Proceedings of the First International Conference on Human Language Technology Research, San Diego, 2001, pp. 1-5.

Lind, R., et al., "The Network Vehicle—A Glimpse into the Future of Mobile Multi-Media", *IEEE Aerosp. Electron. Systems Magazine*, vol. 14, No. 9, Sep. 1999, pp. 27-32.

Zhao, Yilin, "Telematics: Safe and Fun Driving", 2002, *IEEE Intelligent Systems*, vol. 17, Issue 1, pp. 10-14.

Chai et al., "MIND: A Semantics-Based Multimodal Interpretation Framework for Conversational System", *Proceedings of the International CLASS Workshop on Natural, Intelligent and Effective Interaction in Multimodal Dialogue Systems*, Jun. 2002, pp. 37-46.

Cheyer et al., "Multimodal Maps: An Agent-Based Approach", *International Conference on Cooperative Multimodal Corporation* (CMC/95), May 24-26, 1995, pp. 111-121.

Elio et al., "On Abstract Task Models and Conversation Policies" in Workshop on Specifying and Implementing Conversation Policies, *Autonomous Agents '99*, Seattle, 1999, 10 pages.

Turunen, "Adaptive Interaction Methods in Speech User Interfaces", Conference on Human Factors in Computing Systems, Seattle, Washington, 2001, pp. 91-92.

Mao, Mark Z., "Automatic Training Set Segmentation for Multi-Pass Speech Recognition", Department of Electrical Engineering, Stanford University, CA, copyright 2005, IEEE, pp. I-685 to I-688.

Vanhoucke, Vincent, "Confidence Scoring and Rejection Using Multi-Pass Speech Recognition", Nuance Communications, Menlo Park, CA, 2005, 4 pages.

Weng, Fuliang, et al., "Efficient Lattice Representation and Generation", Speech Technology and Research Laboratory, SRI International, Menlo Park, CA, 1998, 4 pages.

El Meliani et al., "A Syllabic-Filler-Based Continuous Speech Recognizer for Unlimited Vocabulary", Canadian Conference on Electrical and Computer Engineering, vol. 2, Sep. 5-8, 1995, pp. 1007-1010.

Arrington, Michael, "Google Redefines GPS Navigation Landscape: Google Maps Navigation for Android 2.0", TechCrunch, printed from the Internet <http://www.techcrunch.com/2009/10/28/google-redefines-car-gps-navigation-google-maps-navigation-android/>, Oct. 28, 2009, 4 pages.

Bazzi, Issam et al., "Heterogeneous Lexical Units for Automatic Speech Recognition: Preliminary Investigations", *Processing of the IEEE International Conference on Acoustics, Speech, and Signal Processing*, vol. 3, Jun. 5-9, 2000, XP010507574, pp. 1257-1260.

O'Shaughnessy, Douglas, "Interacting with Computers by Voice: Automatic Speech Recognition and Synthesis", *Proceedings of the IEEE*, vol. 91, No. 9, Sep. 1, 2003, XP011100665, pp. 1272-1305.

Statement in Accordance with the Notice from the European Patent Office dated Oct. 1, 2007 Concerning Business Methods (OJ EPO Nov. 2007, 592-593), XP002456252.

\* cited by examiner

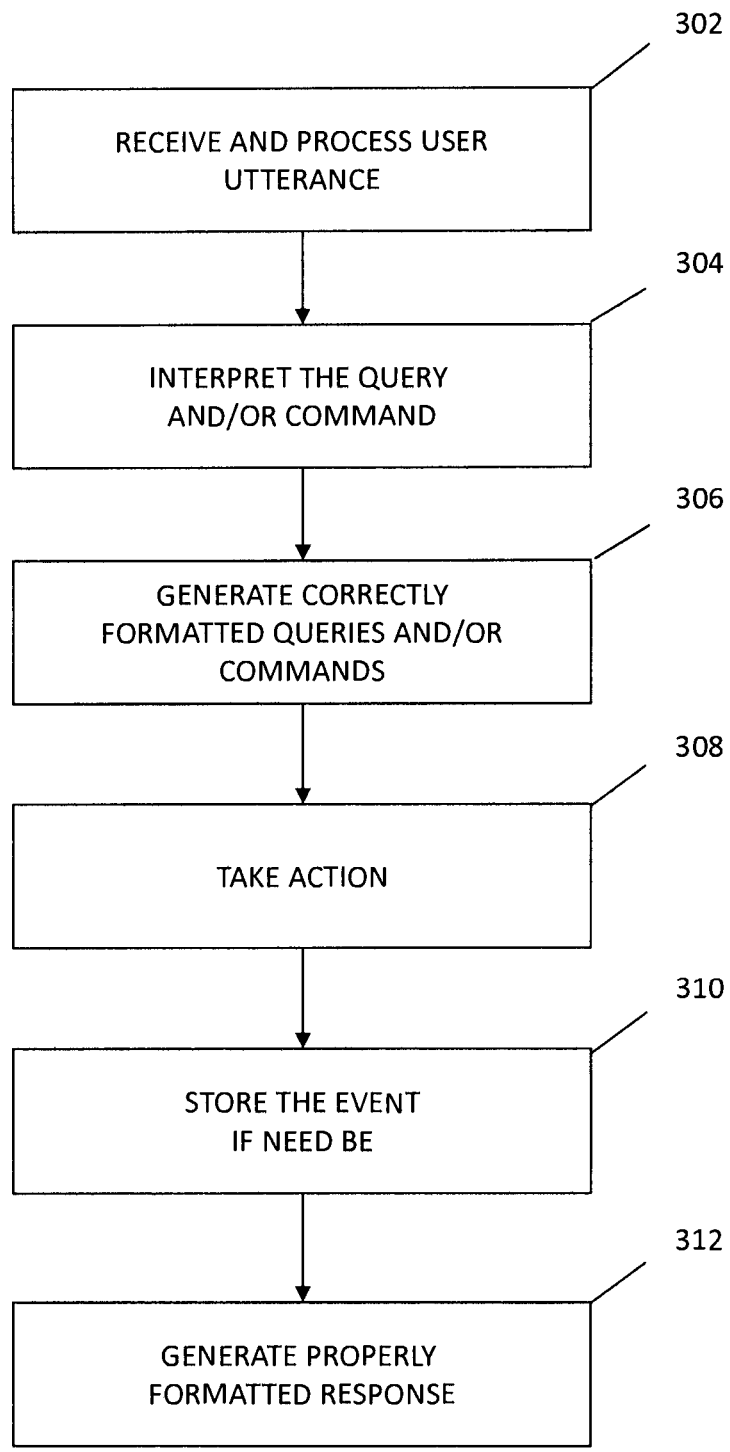

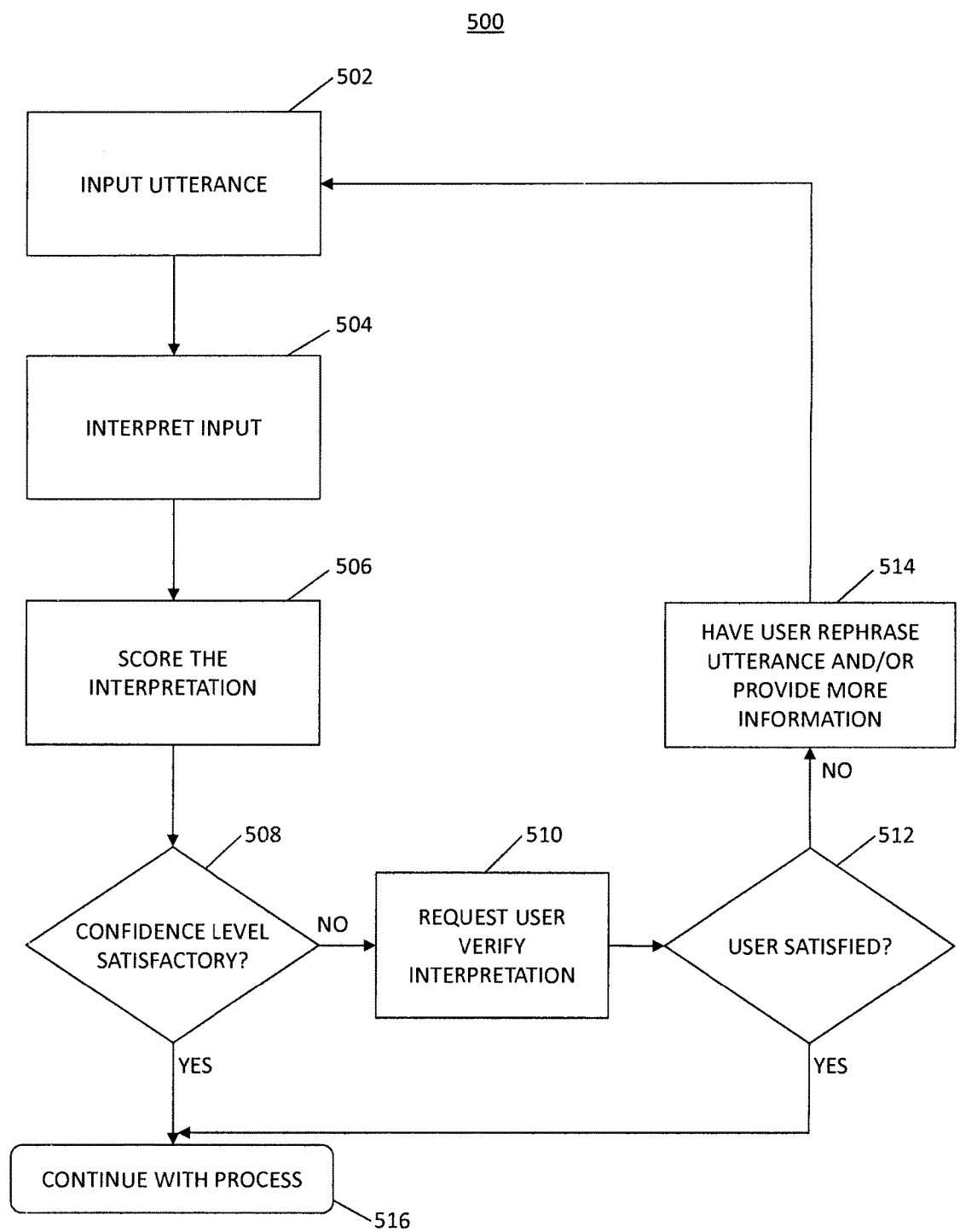

SYSTEM AND METHOD OF SUPPORTING ADAPTIVE MISRECOGNITION IN CONVERSATIONAL SPEECH

CROSS-REFERENCE TO RELATED APPLICATIONS

This application is a continuation of U.S. patent application Ser. No. 13/022,370, entitled "System and Method of Supporting Adaptive Misrecognition in Conversational Speech," filed Feb. 7, 2011, which will issue as U.S. Pat. No. 8,620,659 on Dec. 31, 2013, which is a continuation of U.S. patent application Ser. No. 12/571,795, entitled "System and Method of Supporting Adaptive Misrecognition in Conversational Speech," filed Oct. 1, 2009, which issued as U.S. Pat. No. 8,332,224 on Dec. 11, 2012, which is a continuation of U.S. patent application Ser. No. 11/200,164, entitled "System and Method of Supporting Adaptive Misrecognition in Conversational Speech," filed Aug. 10, 2005, which issued as U.S. Pat. No. 7,620,549 on Nov. 17, 2009, the contents of which are hereby incorporated by reference in their entirety.

FIELD OF THE INVENTION

The invention relates to providing conversational human-machine interfaces for controlling devices through a speech interface and/or a combination of a speech interface and a non-speech interface. More specifically, the invention allows users to submit natural language commands via the speech interface and/or the non-speech interface. The invention further allows users to control devices and systems either locally or remotely.

BACKGROUND OF THE RELATED ART

A machine's ability to communicate with humans in a natural manner remains a difficult problem. Cognitive research on human interaction shows that verbal communication, such as a person asking a question or giving a command, typically relies heavily on context and domain knowledge of the target person. By contrast, machine-based queries (e.g., questions, commands, requests, and/or other types of communications) may be highly structured and may not be inherently natural to the human user. Thus, verbal communications and machine processing of requests that are extracted from the verbal communications may be fundamentally incompatible. Yet the ability to allow a person to make natural language speech-based request remains a desirable goal.

Speech recognition has steadily improved in accuracy and today is successfully used in a wide range of applications. Natural language processing has been applied to the parsing of speech queries. Yet, current systems do not reliably provide a complete environment for users to submit speech and/or non-speech communications through natural language queries that are processed to provide natural responses. There remain a number of significant barriers to creation of a complete speech-based and/or non-speech-based natural language query and response environment.

SUMMARY OF THE INVENTION

According to an aspect of the invention, one object of the invention is to overcome these and other drawbacks of prior systems.

According to one aspect of the invention, users may provide the system with spoken utterances and/or other communications in a natural language format, including imperfect information such as, incomplete thoughts, incomplete sentences, incomplete phrases, slang terminology, repeated words, word variations, synonyms, or other imperfect information. In order for machines (e.g., computer devices) to properly respond to questions and/or commands that are presented in the natural language format, the questions and/or commands may be parsed and interpreted to formulate machine processable queries and algorithms.

In another aspect of the invention, systems are provided for overcoming the deficiencies of prior systems through the application of a complete speech-based command generation, information retrieval, presentation and command environment or a combination of speech-based and non-speech-based command generation, information retrieval, presentation and command environment. This environment makes maximum use of context, prior information, domain knowledge, and user specific profile data to achieve a natural environment for one or more users to submit queries or commands to multiple domains. Through this integrated approach, a complete speech-based natural language query and response environment may be created. Alternatively, a combination of speech-based and non-speech-based natural language query and response environment may be created. Further, at each step in the process, accommodation may be made for full or partial failure and graceful recovery. The robustness to partial failure is achieved through the use of probabilistic and fuzzy reasoning at several stages of the process. This robustness to partial failure promotes the feeling of a natural response to questions and commands.

According to another aspect of the invention, the system may include a speech unit interface device that receives utterances, including spoken natural language queries, commands and/or other utterances from a user, and a computer device or system that receives input from the speech unit and processes the input (e.g., retrieves information responsive to the query, takes action consistent with the command and performs other functions as detailed herein). The system may further generate a natural language response and/or generate a natural language message, such as an alert message, without any prompting from a user. According to another embodiment of the invention, the non-speech interface may be provided in addition to, or in place of, the speech unit interface. For example, the non-speech interface may communicate non-speech information, such as textual communications, graphical or tabular information, or other non-speech information.

According to one embodiment of the invention, multi-modal input may be received from users at a conversational speech analyzer that is coupled to several components, including a general cognitive model, an environmental model, a personalized cognitive model, and an adaptive misrecognition analysis engine, or other components. According to one embodiment of the invention, the conversational speech analyzer may include one or more speech recognition engines that transcribe utterances to text.

According to one embodiment of the invention, the environmental model may be accessed to determine user location, user activity, track user actions, and/or other environmental information to invoke context, domain knowledge, preferences, and/or other cognitive qualities to enhance the interpretation of questions and/or commands. The conversational speech analyzer may also access the general cognitive model and/or the personalized cognitive model to further refine context, domain knowledge, preferences, and/ or other cognitive qualities to enhance the interpretation of questions and/or commands. Based on information received from the general cognitive model, environmental model and/or the personalized cognitive model, the system may enhance responses to commands and questions by including a prediction of user behavior.

An adaptive misrecognition analysis engine may be provided to analyze and store speech and non-speech data, including transcribed utterances, which are identified as being unrecognized or incorrectly recognized by the conversational speech analyzer. Upon a determination that data is unrecognized, the system may generate an unrecognized event. According to one embodiment of the invention, the system may implement one or more techniques to determine that data is incorrectly recognized. When the system misrecognizes a request, the user typically provides immediate feedback, such as overriding the command in a time shorter than the expected time execution time of the command, issuing a stop command, or taking other action. The user's actions may be analyzed in a statistical model to determine a frequency occurrence of misrecognitions for particular commands, with the results being used to update the corresponding personalized cognitive model.

According to another embodiment of the invention, the conversational speech analyzer may access the personalized cognitive model to proactively select a next best (or nth best) match for the received data. A match may be confirmed by user actions that include the user not immediately canceling the command. The misrecognitions may also be analyzed to potentially determine personalized tuning parameters for the speech recognition components of the system. For example, the system may tune the speech recognition engine over time to increase recognition by analyzing how the speech recognition engine misrecognizes the utterance.

According to one embodiment of the invention, infrastructure may be provided to maintain context information during multimodal interactions, such as speech and/or non-speech interactions. According to one exemplary embodiment of the invention, context information may be maintained in a multimodal environment by providing communication channels between multimodal devices, or mobile devices, and the system. The communication channels allow the system to receive multimodal input such as text-based commands and questions and/or voice-based commands and questions. According to another embodiment of the invention, the multimodal input may include a string of text, such as keywords, that are received as commands or questions. According to yet another embodiment of the invention, the system may synchronize the context between the multimodal devices and the speech-based units. In order to send a response to the corresponding device, the system may track the source and send the response to the corresponding speech interface or the non-speech interface.

According to an alternative embodiment of the invention, context information may be maintained using a context manager that may be centrally positioned to receive input from multiple sources and to provide output to multiple sources. According to one embodiment, the devices that communicate with the context manager may register through a registration module and may subscribe to one or more events. According to another embodiment of the invention, the context manager may receive input in Context XML form, for example. The other registered devices may be informed of context changes through a context tracking module to enable synchronizing of context across the registered modules. According to one embodiment of the invention, registered modules may be added or removed from the system. The registered modules may include dynamic link libraries (DLLs) that are specific to multimodal devices.

According to yet another alternative embodiment of the invention, context information may be determined from a command or request that is presented in a textual format and/or a command or request that is presented as a verbal utterance and processed using a multi-pass automatic speech recognition module that transcribes the verbal utterance to a textual format. The multi-pass automatic speech recognition module may use a dictation grammar or a large vocabulary grammar, among other resources, to transcribe the verbal utterance into a text message. On platforms where a dictation grammar is not available, the multi-pass automatic speech recognition may use a virtual dictation grammar that uses decoy words for out-of-vocabulary words. Decoy words may include utility words, nonsense words, isolated syllables, isolated distinct sounds and other decoy words.

According to one embodiment of the invention, the text message may be searched for a particular character, group of characters, word, group of words, and other text combinations. The text combination may be compared against entries in a context description grammar that is associated with each agent. If a match is identified between an active grammar in the context description grammar and the command and/or request, then the match may be scored. The agents may be ranked based on the determined score. In generating an aggregate response from the one or more responses received from the agents, the ordering of the responses from the individual agents may be determined based on the rank of agents. The aggregate response may be generated by a response generator module. Agents may update a context stack, which includes an ordered list of command contexts, to enable follow-up requests.

According to another aspect of the invention, the speech unit and/or multimodal device may be incorporated into the computer device or system, or may be separate structures. If separate structures are provided, the speech unit and/or multimodal devices may be connected to the computer device via a wired or wireless connection. If a wireless connection is provided, a base unit may be connected to the computer, internally or externally, to communicate with the speech unit and/or multimodal device.

According to another aspect of the invention, the computer devices or systems may comprise stand alone or networked PCs, personal digital assistants (PDAs), cellular telephones, or other computer devices or systems. For convenience, these and other computer alternatives are referred to as computers. One aspect of the invention comprises software that may be installed onto the computer, where the software may include one or more of the following modules: a non-speech information receiving module; a speech recognition module that captures user utterances; a parser that parses the utterance; a text to speech engine module that converts the text to speech; a network interface that enables the computer to interface with one or more networks; a non-speech interface module and an event manager for managing events. Preferably, the event manager is in communication with a context description grammar, a user profile module that enables user profiles to be created, modified, and accessed, a personality module that enables various personalities to be created and used, an agent module, an update manager, a cognitive model that provides statistical abstracts of user interaction patterns with the system, one or more databases, and other components.

According to another aspect of the invention domain specific behavior and information may be organized into data managers. Data managers are autonomous executables that receive, process, and respond to user questions, queries and commands. The data managers provide complete, convenient and re-distributable packages or modules of functionality, typically for a specific domain or application. Data managers may be complete packages of executable code, scripts, links to information, and other forms of communication data that provide a specific package of functionality, usually in a specific domain. In other words, data managers include components for extending the functionality to a new domain. Further, data managers and their associated data may be updated remotely over a network as new behavior is added or new information becomes available. Data managers may use system resources and the services of other, typically more specialized, data managers. Data managers may be distributed and redistributed in a number of ways including on removable storage media, transfer over networks or attached to emails and other messages. An update manager may be used to add new data managers to the system or update existing data managers.

According to another aspect of the invention, license management capabilities allowing the sale of data managers by third parties to one or more users on a one time or subscription basis may be provided. In addition, users with particular expertise may create data managers, update existing data managers by adding new behaviors and information, and making these data managers for other users as agents.

In order to enhance the natural query and response environment, the system may format results to increase understandability to users. Formatting and presentation of results may be based on the context of the questions, the contents of the response being presented, the history of the interaction with the user, the user's preferences and interests and the nature of the domain. By contrast, rigid, highly formatted, or structured presentation of results may be deemed unnatural by many users.

According to another embodiment of the invention, the system may simulate some aspects of a human "personality." In some cases, the presentation of the response and the terms that are used to provide the response may be randomized to avoid the appearance of rigidly formatted or mechanical responses. The use of other simulated personality characteristics is also desirable. For example, a response that may be upsetting to the user may be presented in a sympathetic manner. Furthermore, results of requests may be long text strings, lists, tables or other lengthy sets of data. Natural presentation of this type of information presents particular challenges because simply reading the long response is generally not preferred. Instead, the system may parse important sections from the response and may initially provide only reports. Determining what parts of a long response are presented may be based on the context of the questions, the contents of the response being presented, the history of the interaction with the user, the user's preferences and interests and the nature of the domain. At the same time, the system may give the user interactive control over what information to present and how much information to present, to stop the response all together, or to take other actions.

According to another aspect of the invention, the system may process and respond to questions, requests and/or commands. Keywords or context may be used to determine whether the received utterance and/or textual message includes a request or command. For example, utterances may include aspects of questions, requests and/or commands. For example, a user may utter "record my favorite TV program." A request is processed to determine the name, the channel, and time for the user's favorite TV program. A command must be executed to set a video recorder to capture this program.

For utterances including questions and/or requests, the system may perform multiple steps that may include one or more of:

capturing the user's questions and/or requests through speech recognition components that operate in a variety of real-world environments;

parsing and interpreting the question and/or request;

determining the domain of expertise and context, invoking the proper resources, including agents;

formulating one or more requests to one or more local and/or network data sources or sending appropriate commands to local or remote devices or the system itself;

performing presentation formatting, variable substitutions and transformations to modify the requests to a form that yields desired results from the available sources;

executing the multiple requests or commands in an asynchronous manner and dealing gracefully with failures;

extracting or scraping the desired information from the one or more results, which may be returned in any one of a number of different formats;

evaluating and interpreting the results, including processing of errors to provide one or more results judged to be "best," even if the results are ambiguous, incomplete, or conflicting;

performing formatting, variable substitutions and transformations to modify the results to a form most easily understood by the user; and presenting the compound result, through a text to speech engine or a multimodal interface, to the user in a useful and expected manner.

The above steps may be performed with knowledge of the domain of expertise, the context for the question or command, domain specific information, the history of the user's interactions, user preferences, available information sources or commands, and responses obtained from the sources.

Probabilistic or fuzzy set decision and matching methods may be applied to deal with inconsistent, ambiguous, conflicting and incomplete information or responses. In addition, asynchronous queries may be used to provide rapid and graceful failure of requests or commands that allow the system to robustly return results quickly and in a manner that seems natural to the user.

Many everyday questions are inherently subjective and result in answers that are a matter of opinion or consensus, as much as fact. Such questions are often ad hoc in their nature, as well. The system, according to another aspect of the invention, may use adaptive, probabilistic, and fuzzy set decision and matching methods to identify the subjective nature of the question and to evaluate a range of possible answers, wherein one or more answers may be selected that most accurately represent the type of result desired by the user.

The context and expected results from a particular question may be highly dependent on the individual asking the question. Therefore, the system may create, store and use personal profile information for each user. Information in the profile may be added and updated automatically as the user uses the system or may be manually added or updated by the user or by others. Domain specific agents may collect, store and use specific profile information, as may be required for optimal operations. Users may create commands for regularly used reports, automatically generated alerts, and other requests and for the formatting and presentation of results.

The system may use profile data in interpreting questions, formulating requests, interpreting request results and presenting answers to the user. Examples of information in a user profile includes, history of questions asked, session histories, formatting and presentation preferences, special word spelling, terms of interest, special data sources of interest, age, sex, education, location or address, place of business, type of business, investments, hobbies, sports interests, news interests and other profile data.

According to one aspect of the invention, the system may attempt to provide rapid responses in order to provide a natural question and response environment. The rapid responses may be provided without obtaining additional information. The system may determine agent composition, context and/or domain for a user's question or command, for example, by using a real-time scoring system or other technique. Based on this determination, the system may trigger one or more agents to respond to the user's question or command. The agents may make one or more requests and rapidly return a formatted response. Thus, users may receive direct responses to a set of questions, each with a different response or context. In some cases, the available information, including the request results, may not adequately answer the questions presented. In such situations, the user may be asked one or more follow-up questions to resolve the ambiguity. Additional requests may then be made before an adequate response is provided. In these cases, the system may use context information, user profile information and/or domain specific information to minimize the interaction with the user required to deliver a response.

If the confidence level of the domain or context score is not high enough to ensure a reliable response, the system may request that the user verify that the question or command is correctly understood. In general, the question may be phrased to indicate the context of the question including all criteria or parameters. If the user confirms that the question is correct, the system may proceed to produce a response. Otherwise, either the user can rephrase the original question, perhaps adding additional information to remove ambiguity, or the system may ask one or more questions to attempt to resolve the ambiguity or other actions may taken.

According to one aspect of the invention, the system may accept any natural language question or command and, as a result, may be subject to ambiguous requests. To assist users in formulating concise questions and commands, the system may support a voice query language. The language may help users clearly specify the keywords or contexts of the question or command along with the parameters or criteria. The system may provide built in training capabilities to help the user learn the best methods to formulate their questions and commands.

In order to make the responses to user's questions and commands seem more natural, the system may employ one or more dynamically invokable personalities and/or emotional models. Personalities and emotional models have specific characteristics that simulate the behavioral characteristics of real humans. Examples of these characteristics include sympathy, irritation, and helpfulness and associated emotions. The personality also randomizes aspects of responses, just as a real human would do. This behavior includes randomization of terms used and the order of presentation of information. Characteristics of the personality and/or emotions are invoked using probabilistic or fuzzy set decision and matching methods and using criteria, including the context for the question, the history of the user's interaction, user preferences, information sources available, and responses obtained from the sources.

According to another aspect of the invention, special procedures may be employed to present information in the form of long text strings, tables, lists or other long response sets. Simply presenting a long set of information in an ordered manner may not be considered natural or what most users have in mind. The system may use probabilistic or fuzzy set matching methods to extract relevant information and present these subsets first. Further the system may provide commands allowing users to skip through the list, find keywords or key information in the list or stop processing the list altogether.

In addition to the ability to process user questions and commands, the invention may provide local or remote control functions for the system or for other devices. Users may initiate commands locally or remotely. Several techniques for executing remote operations are possible, for example, the use of a telephone or other audio connection. Other remote command techniques may be used. The processing of these commands may be performed in a nearly identical manner to a question. One difference being that the result of the command is generally an action rather than a response. Examples of control operations supported by the invention include, finding and playing music, film, games or other entertainment media, control of the appliances or other electronic or electro-mechanical devices, security systems control, audio, text and video conferencing (including Voice over IP conferencing), operating integrated messaging environments and other control operations.

By using an optional analog or digital telephone interface or a data network interface, the invention can provide remote control capability of the computer or and auxiliary devices connected to the computer. For example, if the computer is connected via an interface to one or more auxiliary devices, a remote user can use this capability to remotely control or program the operation of the auxiliary device. For example, this enables recording of a television program, checking the status of a home security system, checking voice mail messages, hearing and responding to email messages, and much more. For each user command utterance, the system may execute a number of steps possibly including:

capturing the user's command through speech recognition that operates in a variety of real-world environments;

parsing and interpreting the command;

determining the domain for the command and context, invoking the proper resources, including agents;

formulating device specific commands for the system or external devices;

routing commands to the system, or external devices, including external devices connected to data networks;

receiving and processing results of commands, including errors; and optionally, providing responses to users indicating the success or failure of the command, and possibly including state information.

The system may be used in conjunction with a wide range of platform environments. These environments may include, as a peripheral to a PC, a portable or wearable computer or other computer, embedded in a PC or other computer, on a personal digital assistant, such as a PDA with wireless networking capability, in a specialized device such as a bar code scanner or payment terminal, on a wireless telephone, or other platforms. If the invention is used with a mobile or portable device that has position location capability, the location data can be used by the invention as part of the context for user questions. A user may use the system on one or more devices. In this case, history and profile information for the user may be synchronized between the multiple devices on a periodic basis or other basis.

According to another aspect of the invention, the system may be deployed in a network of devices that use a common base of agents, data, information, user profiles and histories. Each user can then interact with, and receive, the same services and applications at any location equipped with the required device on the network. For example, multiple devices on which the invention is deployed, and connected to a network, can be placed at different locations throughout a home, place of business or other location. In such a case, the system may use the location of the particular device addressed by the user as part of the context for the questions asked.

According to one embodiment of the invention, the system may support multiple users that access the system at different times. According to another embodiment of the invention, the system may support multiple users that access the system during a same session in an interleaved or overlapping manner. The system may recognize the multiple users by name, voice, or other characteristic and may invoke a correct profile for each user. If multiple users are addressing the system in overlapping or interleaved sessions, the system may identify the multiple users and may invoke one or more corresponding profiles. For applications that require security safeguards, the multiple users may be verified using voiceprint matching, password or pass-phrase matching, or other security safeguards.

When multiple users are engaged in interleaved sessions, the system may gracefully resolve conflicts using a probabilistic or fuzzy set decision method for each user. This process may simulate the manner in which a human would address multiple questions from various sources. For example, the system may answer short questions first in time while answering longer questions later in time. Alternatively, the system may answer questions in the order that they are received, among other configurations.

Given the desire for domain specific behavior, user specific behavior and domain specific information, the system, according to another aspect of the invention, may allow both users and content providers to extend the system capabilities, add data to local data sources, and add references to network data sources. To allow coverage of the widest possible range of topics, the system may allow third party content developers to develop, distribute and sell specialized or domain specific system programs and information. Content may be created though creation of new data managers, scripting existing data managers, adding new data to agents or databases and adding or modifying links to information sources. Distribution of this information is sensitive to the user's interests and use history and to their willingness to pay or not.

According to another aspect of the invention, the system may allow users to disseminate their knowledge without programming. The system may include mechanisms that allow users to post and distribute data managers and information in their particular areas of expertise, to improve system capability. Further, users can extend the system and configure it to their own preferences, add information to their profile to define new questions or queries, extend and modify existing questions and queries, add new data sources, update data sources, set preferences and specify presentation parameters for results.

Since the invention may operate in many environments, including environments with background noise, point noise sources and people holding conversations, filtering of speech input may be performed. The invention may use, for example, either one-dimensional or two-dimensional array microphones to receive human speech. The array microphones may be fixed or employ dynamic beam forming techniques. The array pattern may be adjusted to maximize gain in the direction of the user and to null point noise sources. Speech received at the microphones may then be processed with analog or digital filters to optimize the bandwidth, cancel echoes, and notch-out narrow band noise sources. Following filtering, the system may use variable rate sampling to maximize the fidelity of the encoded speech, while minimizing required bandwidth. This procedure may be particularly useful in cases where the encoded speech is transmitted over a wireless network or link.

Some example applications for the invention include, but are not limited to, the following:

- white pages and yellow pages lookups to find email addresses, telephone numbers, street addresses, and other information for businesses and individuals;
- personal address book, calendars and reminders for each user;
- automatic telephone dialing, reading and sending emails and pages by voice and other communications control functions;
- map, location and direction applications;
- movie or other entertainment locator, review information and ticket purchasing;
- television, radio or other home entertainment schedule, review information and device control from a local or remote user;
- weather information for the local area or other locations;
- stock and other investment information including, prices, company reports, profiles, company information, business news stories, company reports, analysis, price alerts, news alerts, portfolio reports, portfolio plans, etc.;
- flight or other scheduled transportation information and ticketing;
- reservations for hotels, rental cars and other travel services;
- local, national and international news information including headlines of interest by subject or location, story summaries, full stories, audio and video retrieval and play for stories;
- sports scores, news stories, schedules, alerts, statistics, back ground and history information, etc.;
- ability to subscribe interactively to multimedia information channels, including sports, news, business, different types of music and entertainment, applying user specific preferences for extracting and presenting information;
- rights management for information or content used or published;
- horoscopes, daily jokes and comics, crossword puzzle retrieval and display and related entertainment or diversions;
- recipes, meal planning, nutrition information and planning, shopping lists and other home organization related activities;
- as an interface to auctions and online shopping, and where the system can manage payment or an electronic wallet;
- management of network communications and conferencing, including telecommunications, email, instant messaging, Voice over IP communications and conferencing, local and wide area video and audio conferencing, pages and alerts;
- location, selection, management of play lists and play control of interactive entertainment from local or network sources including, video on demand, digital audio, such as MP3 format material, interactive games, web radio and video broadcasts;

organization and calendar management for families, businesses and other groups of users including the management of, meetings, appointments, and events; and interactive educational programs using local and network material, with lesson material level set based on user's profile, and including, interactive multimedia lessons, religious instruction, calculator, dictionary and spelling, language training, foreign language translation and encyclopedias and other reference material.

It will be appreciated that the foregoing statements of the features of the invention are not intended as exhaustive or limiting, the proper scope thereof being appreciated by reference to this entire disclosure and reasonably apparent variations and extensions thereof.

BRIEF DESCRIPTION OF THE DRAWINGS

The invention will be described by reference to the preferred and alternative embodiments thereof in conjunction with the drawings in which:

FIG. 3 is a high level process for receiving natural language speech-based queries and/or commands and generating a response according to one embodiment of the invention.

FIG. 5 is a process for correctly interpreting a user's utterance according to one embodiment of the invention.

DETAILED DESCRIPTION OF THE PREFERRED EMBODIMENTS

Figure 1:
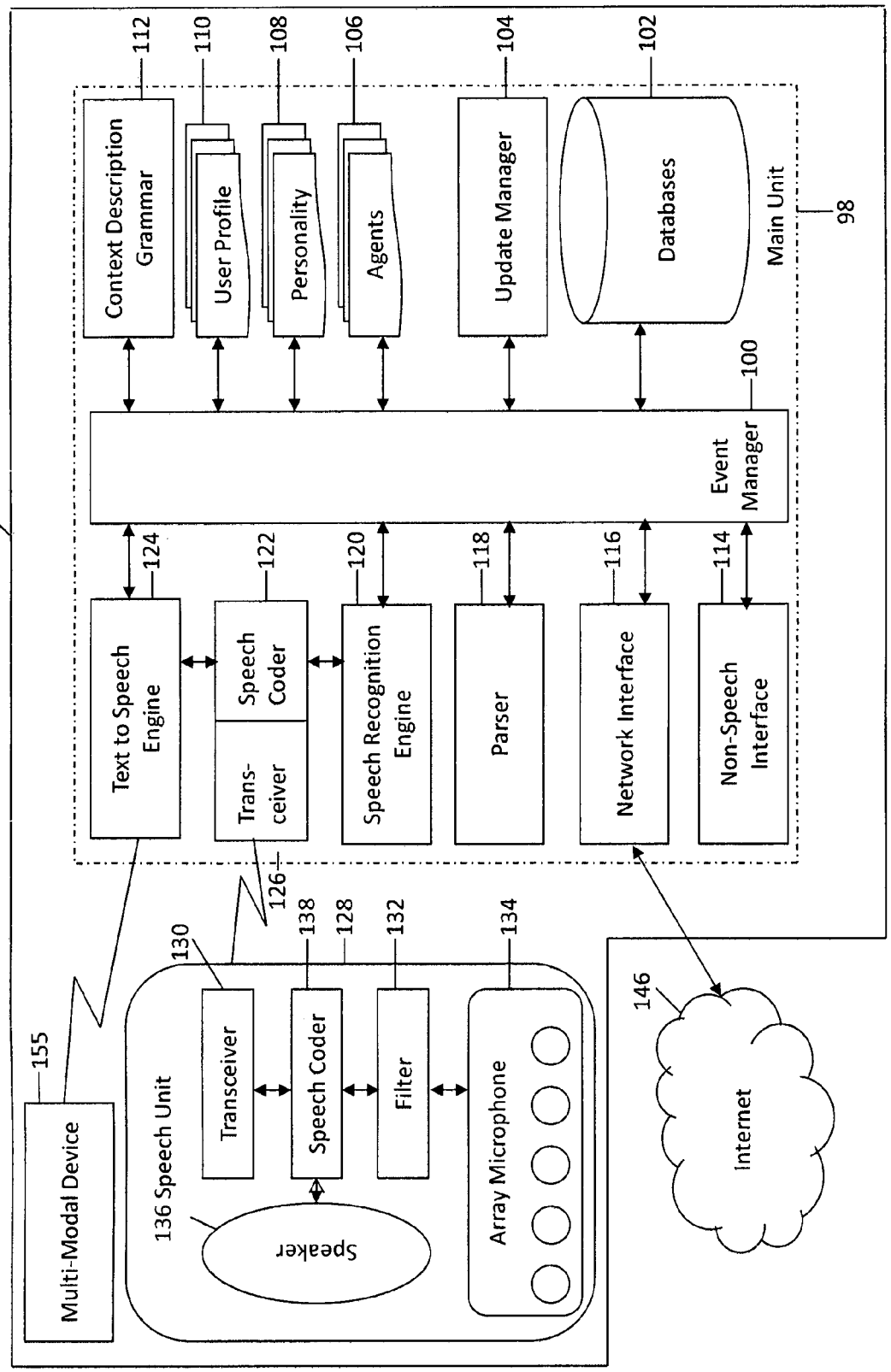
FIG. 1 is an overall diagrammatic view according to one embodiment of the invention.

Barriers to natural human request-response interaction between humans and machines include that natural language queries may be incomplete in their definition. Furthermore, context of previous questions, knowledge of the domain, and/or the user's history of interests and preferences may be needed to properly interpret questions and/or commands. Thus, natural language questions may not be easily transformed to machine processable form. Compounding this problem, natural language questions may be ambiguous or subjective. In these cases, forming a machine processable query and returning a natural language response may be difficult.

In order for machines (e.g., computer devices) to properly respond to questions or commands that are submitted in a natural language form, machine processable queries and algorithms may be formulated after the natural form questions or commands have been parsed and interpreted. Algorithms describe how the machines should gather data to respond to the questions or commands. Depending on the nature of the questions or commands, there may not be a simple set of requests and/or algorithms that will return an adequate response. Several requests and algorithms may need to be initiated and even these requests and algorithms may need to be chained or concatenated to achieve a complete response. Further, no single available source may contain the entire set of results needed to generate a complete response. Thus, multiple requests and/or algorithms, perhaps with several parts, may be generated to access multiple data sources that are located locally, remotely, or both. Not all of the data sources, requests and/or algorithms may return useful results or any results at all.

Useful results that are returned are often embedded in other information and may need to be extracted from the other information. For example, a few keywords or numbers may need to be "scraped" from a larger amount of other information in a text string, table, list, page, video stream or other information. At the same time, extraneous information including graphics or pictures may be removed to process the response. In any case, the multiple results must be evaluated and combined to form the best possible response, even in cases where some requests do not return useful results or fail to produce results entirely. In cases where the question is determined to be ambiguous or the result is inherently subjective, determining the results to present in the response is a complex process. Finally, to maintain a natural interaction, responses should be returned to the user rapidly. Managing and evaluating complex and uncertain requests, while maintaining real-time performance, is a significant challenge.

The following detailed description refers to the accompanying drawings and describes exemplary embodiments of the invention. Other embodiments are possible and modifications may be made to the exemplary embodiments without departing from the spirit, functionality and scope of the invention. Therefore, the following detailed descriptions are not meant to limit the invention.

The invention provides a complete speech-based information query, processing and presentation environment or a combination of speech-based and non-speech-based information query, processing and presentation environment. In addition, the invention may be useful for controlling the system itself and/or external devices. This integrated environment makes maximum use of context, prior information and domain and user specific profile data to achieve a natural environment for one or more users submitting requests or commands in multiple domains. Through this integrated approach, a complete speech-based natural language query, algorithm and response environment or a combination of speech-based and non-speech-based command, algorithm and response environment may be created. FIG. 1 shows one exemplary schematic diagram view of a system 90 according to an embodiment of the invention.

The system 90 may include a main unit 98, speech units 128, and multi-modal devices 155. Alternatively, the system 98 may include completely separate systems for main unit 98, speech units 128 and multi-modal devices 155. The event manager 100 may mediate interactions between other components of main unit 98. The event manager 100 provides a multi-threaded environment allowing the system 98 to operate on multiple commands or questions from multiple user sessions, without conflict, and in an efficient manner to maintain real-time response capabilities.

Figure 8:
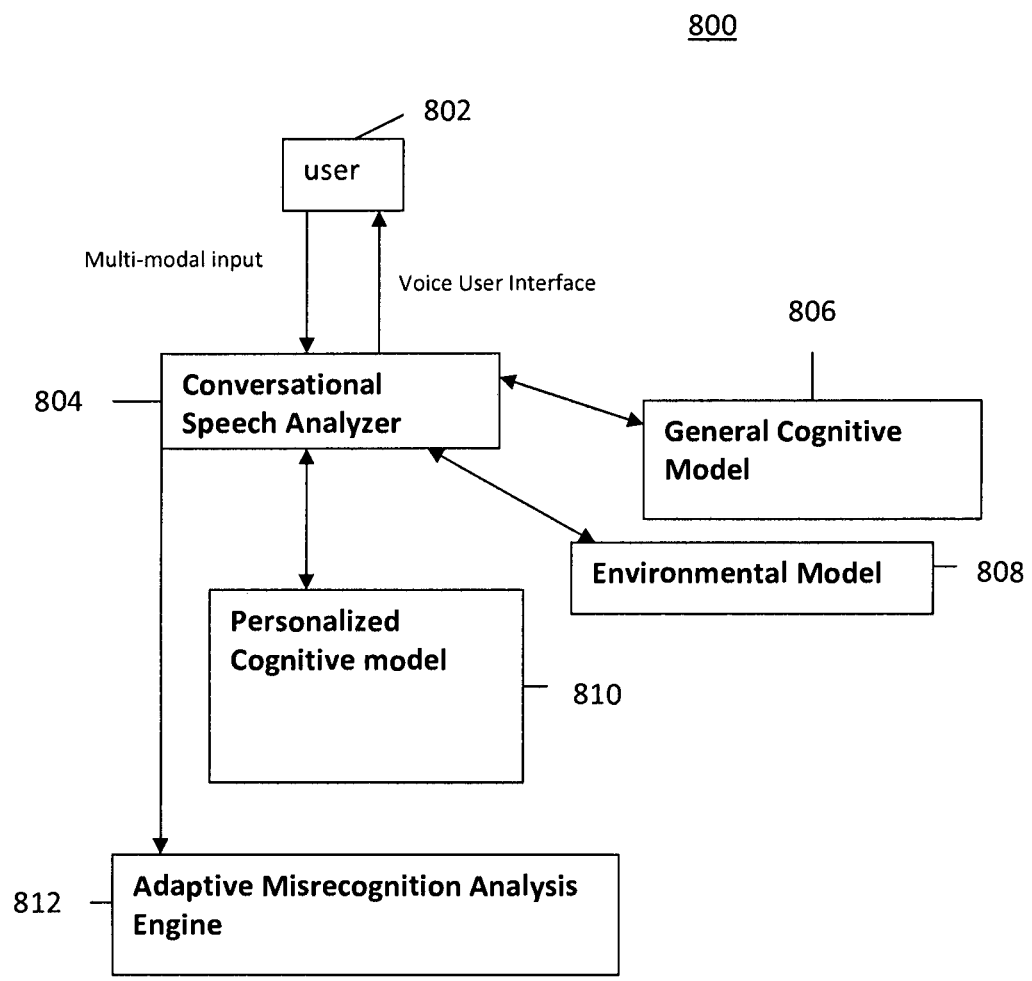
FIG. 8 illustrates a system diagram for an enhanced conversational voice user interface according to one embodiment of the invention.

FIG. 8 illustrates one exemplary embodiment of an enhanced conversational user interface 800 that receives multi-modal input from users 802 and communicates with a conversational speech analyzer 804. The conversational speech analyzer 804 may be coupled to several components, including a general cognitive model 806, an environmental model 808, a personalized cognitive model 810, and an adaptive misrecognition analysis engine 812, or other components. According to one embodiment of the invention, the conversational speech analyzer 804 may include one or more speech recognition engines that transcribe utterances to textual messages. The transcription may be performed using one or more conversational grammars, a context description grammar 112, or other transcription methods. According to one embodiment of the invention, data that is entered in a text format may be merged with data that is transcribed to a textual format from the utterance. Conversational speech analyzer 804 also may include a semantic knowledge-based model that analyzes the text message and detects command components.

According to one embodiment of the invention, personalized cognitive model 810 is a model derived from a user's interaction pattern with the system and may be used to predict what actions the user may take next in time, thus assisting with speech recognition and/or question or command recognition. Personalized cognitive model 810 may track actions performed by the user. When the system is attempting to predict user behavior, the personalized cognitive model may be consulted first. The system may have multiple personalized cognitive models, wherein one or more may correspond to each user.

According to another embodiment of the invention, general cognitive model 806 is a statistical abstract that corresponds to interaction patterns with the system for multiple users. Data stored within general cognitive model 806 may be used to predict a user's next action, thus assisting with speech recognition and/or question or command recognition. The general cognitive model 806 may also track what actions a particular user has performed and may be used when the user interacts with the system in a way that is not handled in the personalized cognitive model.

According to one embodiment of the invention, the environmental model 808 may include information associated with the user's environment and surroundings. The information may include the type of environment that a user is in (e.g., quiet or noisy), details of a microphone and/or speaker system, the user's current global position and movement, as may be determined by GPS, current system status, such as what song/movie is playing, is the system in the midst of retrieving something, or other system status, details on all voice-enabled devices in the immediate vicinity, such as a presence of a voice-enabled TV, stereo, and DVD player in the same room, a user's credit card information, such as numbers and current balances, wherein the user may ask a mobile telephone to download and pay for a video and the system may respond that there are insufficient funds, or other information. The information may be accessed to invoke a context, domain knowledge, preferences, and/or other cognitive quality that enhances the interpretation of questions and/or commands.

The conversational speech analyzer 804 may also access the general cognitive model 806 and/or the personalized cognitive model 810 to further refine context, domain knowledge, preferences, and/or other cognitive qualities to enhance the interpretation of questions and/or commands.

Based on information received from general cognitive model 806, environmental model 808 and/or the personalized cognitive model 810, the system may enhance responses to commands and questions by including a prediction of user behavior.

Adaptive Misrecognition Analysis Engine 812 may analyze and store textual messages, including transcribed utterances that are identified as being unrecognized or incorrectly recognized by conversational speech analyzer 804. Upon a determination that text is unrecognized, the system may generate an unrecognized event. For example, an unrecognized event may result from not finding a match to text and/or transcribed utterance.

According to one embodiment of the invention, the system may implement one or more techniques to determine that textual messages are incorrectly recognized. For example, the user may command the system to play a specific song title and the system may misrecognize the requested song title and provide a song having a different title, the system may misrecognize an incorrect song title and provide a song having a different than requested title, the system may misrecognize a correct song title and provide a song having an invalid song title, among other variations. When the system misrecognizes a request, the user typically provides immediate feedback such as, overriding the command in a time shorter than the expected time execution time of the command, repeating the original request, issuing a stop command, or taking other action, wherein the action may be presented verbally, non-verbally by pushing a selected button on a cell phone or remote control, or both, among other configurations. According to one embodiment of the invention, the system may detect the user action and may prompt the user to re-phrase the request to enable the system to modify words in the query. The user's actions may be analyzed in a statistical model to determine a frequency occurrence of misrecognitions for particular commands, with the results being used to update the corresponding personalized cognitive model 810.

According to another embodiment of the invention, the conversational speech analyzer 804 may access the personalized cognitive model 810 to proactively select a next best (or nth best) match for the received text. A match may be confirmed by user actions that include the user not immediately canceling the command. The misrecognitions may also be analyzed to potentially determine personalized tuning parameters for the speech recognition components of the system. For example, the system may, over time, tune the speech recognition engine to increase recognition by analyzing how the speech recognition engine misrecognizes the verbal utterance.

Agents 106 may include a collection of grammars, criteria handlers, and algorithms that are accessed to respond to a set of requests and/or commands. Agents 106 further may contain packages of both generic and domain specific behavior for the system 98. Agents 106 may use nonvolatile storage for data, parameters, history information, and locally stored content provided in the system databases 102 or other local sources. One or more user profiles 110 may be provided that includes user specific data, parameters, and session and history information for determining the behavior of agents 106. One or more personality modules 108 may be provided in a data determining system that includes personality characteristics for agents 106. The update manager 104 manages the automatic and manual loading and updating of agents 106 and their associated data from the Internet 146 or other network through the network interface 116.

According to one embodiment of the invention, the speech-based interface for the system 90 may include one or more speech units 128. Speech units 128 may include one or more microphones, for example array microphone 134, to receive the utterances from the user. The speech received at the microphone 134 may be processed by filter 132 and passed to the speech coder 138 for encoding and compression. In one embodiment, a transceiver module 130 may transmit the coded speech to the main unit 98. Coded speech received from the main unit 98 is detected by the transceiver 130, then decoded and decompressed by the speech coder 138 and annunciated by the speaker 136.

According to one embodiment of the invention, the non-speech-based interface for the system 90 may include one or more multi-modal devices 155 that may include mobile devices, stand alone or networked computers, personal digital assistances (PDAs), portable computer devices, or other multi-modal devices.

The speech units 128, multi-modal devices 155 and the main unit 98 may communicate over a communication link. The communication link may include a wired or wireless link. According to one embodiment, the communication link may comprise an RF link. The transceiver 130 on the speech unit may communicate coded speech data bi-directionally over the communication link with the transceiver 126 on the main unit 98. According to another embodiment, RF link may use any standard local area wireless data protocols including the IEEE 802.11, Bluetooth or other standards. Alternatively, an infrared data link conforming to any suitable standard such as IrDA or other infrared standards can be used. In an alternative embodiment, wires may connect the speech unit 128 and the main unit 98, eliminating the need for one speech coder 138. Other wired or wireless analog or digital transmission techniques can be used.

According to one embodiment of the invention, coded speech received at the transceiver 126 on the main unit 98 may be passed to the speech coder 122 for decoding and decompression. The decoded speech may be processed by the speech recognition engine 120 using the context description grammar module 112, among other information. Any recognized information may be processed by the parser 118, which transforms information into complete algorithms and questions using data supplied by knowledge agents. Knowledge agents may be selected from the plurality of agents 106 using a grammar stack, wherein the knowledge agents provide information for generating a response to the question or command. The knowledge agents may then process the commands or questions by creating requests that are submitted to local databases 102 or submitted through the network interface 116 to external data sources over the Internet 146 or external other networks. Algorithms typically result in actions taken by the system 90 itself (i.e., pause or stop), or to a remote device or data source (i.e., download data or program, or control a remote device), through the network interface to the Internet or other data interface.

According to one embodiment of the invention, knowledge agents may return results of questions as responses to users. The responses may be created using the results of information requests, the system personality 108, the user preferences, other data in the user profile 110, and/or other information. Agents 106 may present these results using the speech unit 128. The agents 106 may create a response string, which is sent to the text to speech engine 124. The text to speech engine 124 may generate the utterances, which may be encoded and compressed by the speech coder 122. Once coded, the utterances are transmitted from the main unit 98 by the transceiver 126 to the transceiver 130 on the speech unit 128. The utterance is then decoded and decompressed by the speech coder 138 and output by the speaker 136. Alternatively, agents 106 may present the results using multi-modal devices 155.

The non-speech interface 114 may be integral with, or separate from, the multi-modal devices 155 and may be used as a substitute or may complement the speech interface. For example, non-speech interface 114 may be used to present and to interact with non-speech (e.g., graphical or tabular) information in a manner more easily understood by the user. According to one embodiment of the invention, multimodal support may be provided to maintain the context during both voice interaction and interaction through the non-speech interface 114. In one exemplary embodiment, a communication channel may be opened between multimodal devices 155 and the main user interface system 90 to allow multimodal devices 155 to input text commands and questions. The multimodal devices 155 may receive and/or provide one or more types of communications, including speech, text, digital audio files, dual-tone-multi-frequency (DTMF) or other communication types. According to another embodiment of the invention, multimodal devices 155 may send a string of text or keywords for a command or question. The main interface system 90 may synchronize the context between multimodal device 155 and the speech units 128. In order to send a response to the corresponding device, the main user interface system 90 may track where the input came from so that the response may be sent to a TTS or multi-modal device 155.

Figure 7:
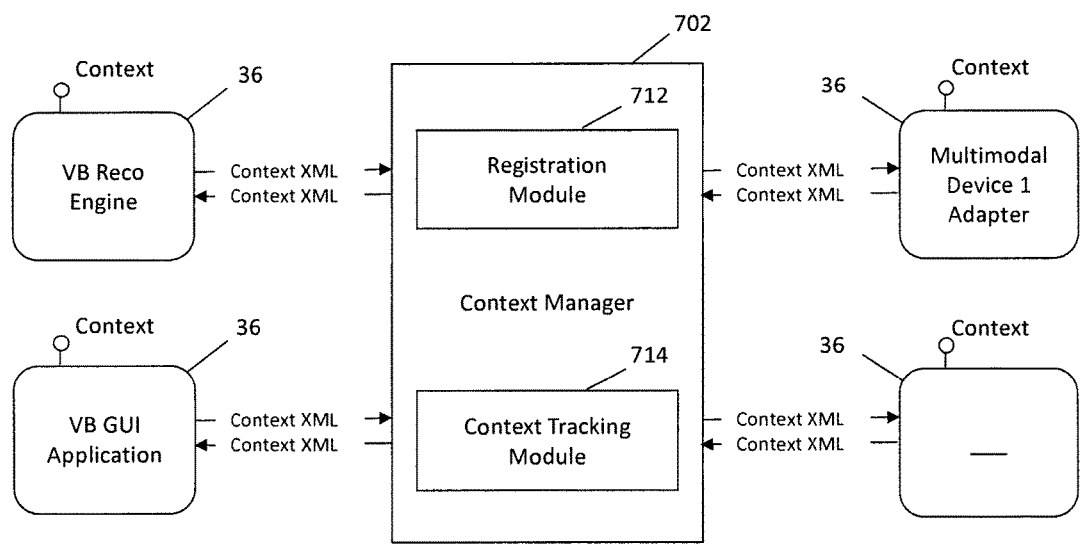
FIG. 7 illustrates a diagram for centrally maintaining a context, according to one embodiment of the invention.

According to an alternative embodiment of the invention illustrated in FIG. 7, a context manager 702 may be centrally maintained to allow input from and output to multiple mobile devices 36. Each of the mobile devices may communicate with the context manager 702 to register via registration module 712, wherein registration may indicate events that the mobile devices 36 may subscribe to. The context manager 702 may receive input in Context XML form, for example. The other registered mobile devices 36 may be informed of context changes through context tracking module 714, thereby synchronizing the context across the registered mobile devices 36. According to one embodiment of the invention, registered terminal devices may be added or removed. The registered terminal devices may be dynamic link libraries (DLLs) that may be specific to a multimodal device.

According to yet another alternative embodiment of the invention, context information may be determined from a command or request that is presented as a text message and/or a command or request that is presented as a verbal utterance and processed using a multi-pass automatic speech recognition module that transcribes the verbal utterance to a text message. The multi-pass automatic speech recognition module may use a dictation grammar or a large vocabulary grammar, among other resources, to transcribe the verbal utterance into a text message. On platforms where a dictation grammar is not available, the multi-pass automatic speech recognition may use a virtual dictation grammar that uses decoy words for out-of-vocabulary words. Decoy words may include utility words, nonsense words, isolated syllables, isolated distinct sounds and other decoy words.

According to one embodiment of the invention, the text message may be searched for a particular character, group of characters, word, group of words, and other text combinations. The text combination may be compared against entries in a context description grammar that is associated with each agent 106. If a match is identified between an active grammar in the context description grammar and the command and/or request, then the match may be scored. The agents 106 may be ranked based on the determined score. In generating an aggregate response from the one or more responses received from the agents 106, the ordering of the responses from the individual agents may be determined based on the rank of agents 106. The aggregate response may be generated by a response generator module. Agents 106 may update a context stack, which includes an ordered list of command contexts, to enable follow-up requests.

According to another embodiment of the invention, if a match is not found, or only a partial match is found, between the text message and active grammars, then a knowledge-enhanced speech recognition system may be used to semantically broaden the search. The knowledge-enhanced speech recognition system may be used to determine the intent of the request and/or to correct false recognitions. The knowledge-enhanced speech recognition may access a set of expected contexts that are stored in a context stack to determine a most likely context. The knowledge-enhanced speech recognition may use context specific matchers that are able to identify context such as time, location, numbers, dates, categories (e.g., music, movies, television, addresses, etc.) and other context. The matching may be performed by comparing a character, group of characters, a word, group of words, and other text combinations. Alternatively, or in addition to text based matching, the matching may be performed using phonetic matching, among other techniques. The results of any match may be used to generate a command and/or request that may be communicated to agents 106 for additional processing. According to one embodiment of the invention, non-speech interface 114 may show system, state and history information in a more concise manner than is possible through the speech interface. Non-speech interface 114 may be accessed to create or extend capabilities of agents 106. These operations may include scripting of agents, adding data to the agent or databases 102 used by the agent, adding links to information sources, among other operations.

Figure 2:
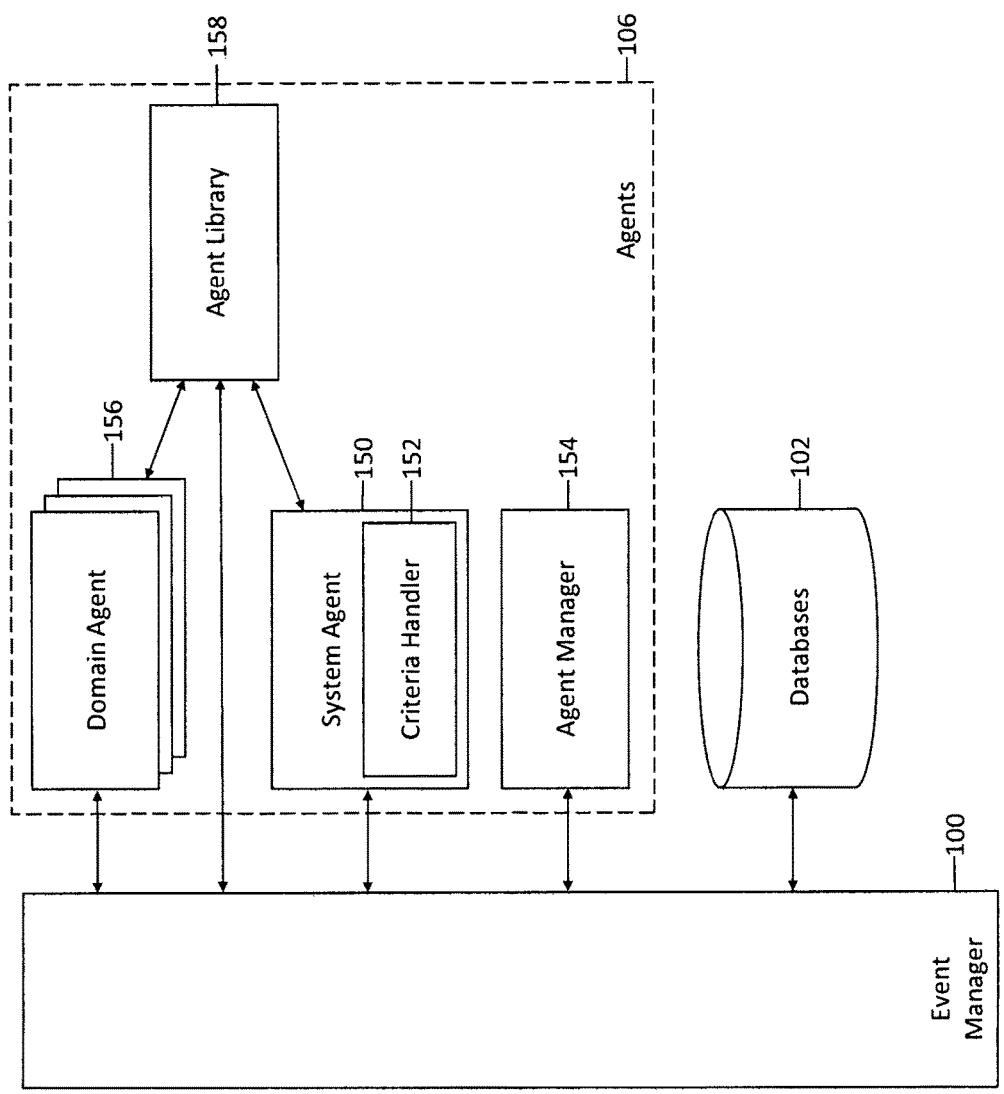
FIG. 2 is a schematic block diagram showing the agent architecture according to one embodiment of the invention.

According to another embodiment of the invention, system 90 may include different types of agents 106. For example, generic and domain specific behavior and information may be organized into domain agents. A system agent, on the other hand, may provide default functionality and basic services. The domain agents provide complete, convenient and re-distributable packages or modules for each application area. In other words, the domain agents include data that is needed to extend or modify the functionality of the system 90 in a current or new domain. Further, domain agents and their associated data can be updated remotely over a network as new behavior is added or new information becomes available. Domain agents may use the services of other, typically more specialized, data managers and the system agent 150. Agents are distributed and redistributed in a number of ways including on removable storage media, transfer over networks or attached to emails and other messages. The invention may provide license management capability allowing the sale of data managers by third parties to one or more users on a one time or subscription basis. In addition, users with particular expertise may create data managers, update existing data managers by adding new behaviors and information, and make these data managers to other users as agents. A block diagram of an agent architecture according to an embodiment of the invention is shown in FIG. 2.

Agents 106 may receive and return events to the event manager 100. Both system agents 150 and domain agents 156 may receive questions and commands from the parser 118. Based on keywords in the questions and commands and the structures of the questions and commands, the parser may invoke selected agents. Agents use the nonvolatile storage for data, parameters, history information and local content provided in the system databases 102.

According to one embodiment of the invention, when the system starts-up or boots-up, the agent manager 154 may load and initialize the system agent 150 and the one or more domain agents 156. Agent manager 154 includes knowledge of agents 106 and maps agents 106 to the agent library 158. At shutdown, the agent manager may unload the agents 106. The agent manager 154 also performs license management functions for the domain agents 156 and content in the databases 102.

The system agent 150 manages the criteria handlers 152 that handle specific parameters or values (criteria) used to determine context for questions and commands. According to one embodiment of the invention, criteria handlers 152 include parsing routines that are specialized to recognize particular parts of speech, such as times, locations, movie titles, and other parts of speech. The criteria handlers 152 may identify matching phrases and extract semantic attributes from the phrases. Both the system agent 150 and the domain agents 156 may use the criteria handlers 152. The various domain agents 156 may use the services of the system agent 150 and of other, typically more specialized, domain agents 156. The system agent 150 and the domain agents 156 may use the services of the agent library 158, which contains utilities for commonly used functions. According to one embodiment of the invention, the agent library may be a dynamic link library that implements one or more agents. The agent library may include utilities for text and string handling, network communications, database lookup and management, fuzzy and probabilistic evaluation, text to speech formats, and other utilities.

Domain agents 156 may be data-driven, scripted or created with compiled code. A base of generic agent may be used as the starting point for data-driven or scripted agents. Agents created with compiled code are typically built into dynamically linkable or loadable libraries. Developers of agents can add new functionality to the agent library 158 as required. Details of agent distribution and update, and agent creation or modification are discussed in sections below.

According to another embodiment of the invention, capabilities are provided to distribute and update system agents 150, domain agents 156, agent library 158 components, databases 102, and context description grammar 112 over wireless or wired networks 136, including dial-up networks using the update manager 104. The network interface 116 may provide connections to one or more networks. The update manager 104 may also manage the downloading and installation of core system updates. The agent manager 154 may perform license management functions for the domain agents and the databases. The update manager 104 and agent manager 154 may perform these functions for all agents and database content including, agents and content available to all users or agents and/or content available to selected users. Examples of agent and database components added or updated on a periodic basis include:

agents for new domains;
additional domain knowledge for agents;
new keywords for a domain, which can include names of politicians, athletes, entertainers, names of new movies or songs, etc. who have achieved recent prominence;

links to a preferred set of information sources for the domains covered including links for, entertainment, news, sports, weather, etc.;

updates to domain information based on, for example, changes to tax laws, company mergers, changing political boundaries;

updates to content, including dictionaries, encyclopedias and almanacs; and other content and database components.

When a user requires or selects a new domain agent 156 or database element 102, the update manager 104 may connect to their source on the network 146 though the network interface 116, download and install the agent or data. To save system resources and to comply with any license conditions, the update manager 104 may uninstall agents that are no longer in use. In one embodiment of the invention, the update manager 104 may periodically queries one or more sources of the licensed agents and database components to locate and download updates to agent executables, scripts or data as they become available. Alternatively, the agent sources may initiate the downloading of agent updates of the registered or licensed agents to the update manager as they become available.

The agent manager 154 may provide license management clients that are capable of executing most any license terms and conditions. When a particular agent 106 and/or database element 102 is selected based on a submitted command, the agent manager 154 verifies that the use of the agent or data element is within the allowed terms and conditions, and if so, invokes the agent or allows access to the data element. License management schemes that can be implemented through the agent manager 154 include outright purchase, subscription for updates, one time or limited time use. Use of shared agents and data elements (such as those downloaded from web sites maintained by groups of domain experts) may also be managed by the agent manager 154.

If questions or commands do not match an agent that is currently loaded on the system, the agent manager 154 may search the network 146 through the network interface 116 to find a source for a suitable agent. Once located, the agent can be loaded under the control of the update manager 104, within the terms and conditions of the license agreement, as enforced by the agent manager.

New commands, keywords, information, or information sources can be added to any domain agent 156 by changing agent data or scripting. These configuration capabilities may allow users and content developers to extend and modify the behavior of existing domain agents 156 or to create new domain agents 156 from a generic agent without the need to create new compiled code. Thus, the modification of the domain agents 156 may range from minor data-driven updates by even the most casual users, such as specifying the spelling of words, to development of complex behavior using the scripting language as would typically be done by a domain expert. The user can create and manage modifications to domain agents 156 through speech interface commands or using non-speech interface 114. User-specific modifications of domain agents 156 are stored in conjunction with the user's profile 110 and accessed by the domain agent 156 at run-time.

The data used to configure data driven agents 156 are structured in a manner to facilitate efficient evaluation and to help developers with organization. These data are used not only by the agents 156, but also by the speech recognition engine 120, the text to speech engine 124, and the parser 118. Examples of some major categories of data include:

1. Content packages include questions or commands. Each command or question or group of commands or questions includes contexts used for creation of one or more requests. The domain agent 156 passes a context description grammar expression to the parser 118 for evaluation of a context or question. An initial or default context is typically supplied for each command or question. The command or question may include a grammar for the management and evaluation of the context stack.
2. Page lists or pointers to other local or network content sources. For each page or content source there is a pointer (e.g., URL, URI, or other pointer) to the page or source. Each page has specific scraping information used to extract the data of interest. The scraping information includes matching patterns, HTML or other format parsing information.
3. A response list, determining the response of the domain agent 156 to a particular command or question given the context, the user profile and the information retrieved. Responses can include diagnostic error messages or requests for more information if the question or command cannot yet be resolved from the known information. Responses can be based on or dependent on thresholds or probabilistic or fuzzy weights for the variables.
4. Substitution lists containing variable substitutions and transformations, often applied by the agents 150, 156 in the formatting of queries and results. For example, a stock domain specific agent 156 would use a substitution list of company trading symbols, company names and commonly used abbreviations. Substitutions and transformations can be performed on commands and questions to create precise queries, which can be applied against one or more information sources or to results for creating more meaningful output to the user. Substitution lists also include information for optimally dealing with structured information, such as HTTP formatted page parsing and evaluation.
5. Personalities used for responses. Personalities are constructed by combining multiple traits in a weighted manner. Weights can be specified for each agent's domain area to create one or more specific personalities. Examples of personality traits include sarcasm, humor, irritation, and sympathy, and other traits.
6. Public and user specific parameters for sources, substitutions, transformations, variables or criteria. The public parameter lists are part of the agent package 156. The user specific parameters are contained in the user profile 110.

Commands and questions are interpreted, queries formulated, responses created and results presented based on the users personal or user profile 110 values. Personal profiles may include information specific to the individual, their interests, their special use of terminology, the history of their interactions with the system, and domains of interest. The personal profile data may be used by the agents 106, the speech recognition engine 120, the text to speech engine 124, and the parser 118. Preferences can include, special (modified) commands, past behavior or history, questions, information sources, formats, reports, and alerts. User profile data can be manually entered by the user and/or can be learned by the system 90 based on user behavior. User profile values may include:

spelling preferences;

date of birth for user, family and friends;

income level;

gender;
occupation;
location information such as, home address, neighborhood, and business address;
car type;
telecommunications and other service providers and services;
financial and investment information;
synonyms (i.e., a nick name for someone);
special spelling;
keywords;
transformation or substitution variables;
domains of interest; and
other values.

End users may use the data driven agent 156 extension and modification facilities and values stored in user profiles 110 to create special reports, packages of queries, alerts and output formats. A single alert or report can be configured to use multiple data sources, values, and other variables (i.e., time, location, etc.) to determine when alerts should be sent. For example, an alert can be generated by sampling a stock price every fifteen minutes and sending an alert if the price drops below some value. To create a report, the user first specifies a set of commands or questions. Next, the user creates or selects a format for the report. Finally the user may name the report. A report can have variable parameters. For example, users may create a company stock report, and execute the report by stating its name and the company name, which gives the user selected information and in a specified format for that company. In another example, users can create a "morning" report, which presents selected multimedia information from different sources (news, sports, traffic, and weather) in the order and formats desired. Alerts and reports can be created using only voice commands and responses, commands and responses through non-speech interface 114, or a combination of the two. To create a report, alert, or other specialized behavior, the user performs a number of steps including:

specify the command to run a report or alert;
specify the question or questions, including keywords, used for a query;
set the criteria for running the report such as on command or when a particular condition is met;
define preferred information sources;
define preferences for order of result evaluation by source, value, etc.;
specify the presentation medium for a report or alert, such as an email, the text to speech engine, a message to a pager, or a text and graphics display; and
specify the preferred format for the report, such as information to be presented, order of information to be presented, preferred abbreviations or other variable substitutions.

Filtering and noise elimination may be important in facilitating the various functionalities of system 90. Recognition and parsing of the user's speech may be implemented with good signal to noise ratio at the input to the speech recognition engine 120. To provide acceptable results, a set of acoustic models, an array microphone 134 a filter 132, or other components, may be employed. If a good signal to noise ratio cannot be achieved, a noise identification algorithm may be used and the appropriate acoustic model, for example, one that has been trained in conditions similar to the identified noise, may be selected. According to an embodiment of the invention, the microphone array, filters and speech coder 138 are physically separated from the main unit 98 into a speech unit 128, and connected using a wireless link. Since bandwidth on a wireless connection is at a premium, the speech coder dynamically adapts the digitization rate and compression of the captured speech.

The speech unit 128 may use an array of microphones 134 to provide better directional signal capture and noise elimination than can be achieved with a single microphone. The microphone array can be one-dimensional (a linear array) or two-dimensional (a circle, square, triangle or other suitable shape). The beam pattern of the array can be fixed or made adaptive though use of analog or digital phase shifting circuitry. The pattern of the active array is steered to point in the direction of the one or more users speaking. At the same time, nulls can be added to the pattern to notch out point or limited area noise sources. The use of the array microphone also helps reduce the cross talk between output from the text to speech engine 124 through the speaker 136 and detection of the user's speech.

The microphone can be complemented with an analog or digital (i.e., Voice over IP) speech interface. This interface allows a remote user to connect to the system and interact with the system in the same manner possible if they were physically present.

The speech unit 128, according to an embodiment of the invention, may use an analog or digital filter 132 between the array microphone 134 and the speech coder 138. The pass band of the filter is set to optimize the signal to noise ratio at the input to the speech recognition engine 120. In some embodiments, the filter is adaptive, using band shaping combined with notch filtering to reject narrow-band noise. In one embodiment of the invention, the system 90 may employ adaptive echo cancellation in the filter. The echo cancellation helps prevent cross talk between output from the text to speech engine and detection of the user's speech as well as suppression of environmentally caused echoes. Calculations are conducted for comparing the background noise to the signal received from the user's speech to optimize the band-shaping parameters of the adaptive filter. Those skilled in the art will be familiar with multiple techniques used to construct suitable digital and analog filters.

The speech received by the array microphone 134 and passed through the filter 132 may be sent to the speech digitizer or coder 138. The speech coder 138 may use adaptive lossy audio compression to optimize bandwidth requirements for the transmission of the coded speech to the speech recognition engine 120 over a wireless link. The lossy coding may be optimized to preserve only the components of the speech signal required for optimal recognition. Further, the lossy compression algorithms that may be used may be designed to prevent even momentary gaps in the signal stream, which can cause severe errors in the speech recognition engine. The digitized speech may be buffered in the coder and the coder may adapt the output data rate to optimize the use of the available bandwidth. The use of the adaptive speech coder is particularly advantageous when a band-limited wireless link is used between the coder and the speech recognition engine.

In an alternative embodiment, the array microphone can be replaced by a set of physically distributed microphones or a headset worn by the user. The distributed microphones can be placed in different parts of a room or in different rooms. The distributed microphones can create a three-dimensional array to improve signal to noise ratio. The headset may use a wireless or wired connection.

While the invention is intended to be able to accept most any natural language question or command, ambiguity may be a problem. To assist users formulate concise questions and commands, the system 90 may support a voice query language. The language is structured to allow a variety of queries with minimal ambiguity. Thus, the voice query language helps users clearly specify the keywords or contexts of the question or command along with the parameters or criteria. The language provides a grammar to clearly specify the keyword used to determine the context and a set of one or criteria or parameters. A user asking a question or stating a command in the voice query language is nearly always guaranteed to receive a response.

The voice query language may be sensitive to the contents of the context stack, wherein a context defines a set of questions that can be activated or deactivated during a conversation. According to one embodiment, each agent may designate one context to be the root context that defines base algorithms that the agent implements. Thus, following-on questions can be asked using an abbreviated grammar, since keywords and criteria can be inherited from the context stack. For example, the user can simply ask about another keyword if the criteria of the question remain constant.

The system 90 may provide built in training capabilities to help the user learn the best methods to formulate their questions and commands. The interactive training allows users to audibly or visibly see the machine interpretation of their queries and provides suggestions on how to better structure a query. Using the interactive training users can quickly become comfortable with the voice query language and at the same time learn how to optimize the amount of information required with each step of a dialog.

The output of the speech coder 122 may be fed to the speech recognition engine 120. The speech recognition engine 120 recognizes words and phrases, using information in the context description grammar 112, and passes these to the parser 118 for interpretation. The speech recognition engine 120 may determine the user's identity by voice and name for each utterance. Recognized words and phrases may be tagged with this identity in all further processing. Thus, as multiple users engage in overlapping sessions, the tags added by the speech recognition engine 120 to each utterance allows other components of the system 90 to tie that utterance to the correct user and dialog. The user recognition capability may further be used as a security measure for applications, such as auctions or online shopping, where this is required. Voice characteristics of each user may be contained in the user profile 110.

According to one embodiment of the invention, users may start a dialog with the system 90 when they first address it. This can be done by speaking a generic word ("computer") or addressing a specific name ("Fred"), which may be generally tied to a system personality 108. Once the user starts the dialog, it may be recognized by the speech recognition engine 120, using unique characteristics of the user's speech. At the end of a dialog or to interrupt a dialog, the user may utter a dismissal word ("good bye").

According to another embodiment of the invention, the system 90 may employ a speech recognition engine 120 that gains improved word recognition accuracy using data from context description grammar 112, user profiles 110, and the agents 106, among other components. At the same time, the fuzzy set possibilities or prior probabilities for the words in the context description grammar may be dynamically updated to maximize the probability of correct recognition at each stage of the dialog. The probabilities or possibilities may be dynamically updated based on a number of criteria including the application domain, the questions or commands, contexts, the user profile and preferences, user dialog history, the recognizer dictionary and phrase tables, and word spellings, among other criteria.

For uncommon words or new vocabulary words, a user may be given the option to spell the words. The spelling may be done by saying the names or the letters or using a phonetic alphabet. The phonetic alphabet can be a default one or one of the user's choosing.

Alternatively, when a user submits a word that is not recognized at all or is not correctly recognized by the speech recognition engine 120 then the user may be asked to spell the word. The speech recognition engine 120 determines this condition based on confidence level for the scoring process. The word may be looked up in a dictionary and the pronunciation for the word is added to the dictionary, the agent 106, and/or the user's profile 110. The word pronunciation can then be associated with the domain, the question, the context and the user. Through this process, the speech recognition engine learns with time and improves in accuracy. To assist users in spelling words, an individualized phonetic alphabet can be used. Each user can modify the standard phonetic alphabets with words, which they can remember more easily.

Once the words and/or phrases have been recognized by the speech recognition engine 120, the tokens and user identification is passed to the parser 118. The parser 118 examines the tokens for the questions or commands, context and criteria. The parser 118 determines a context for an utterance by applying prior probabilities or fuzzy possibilities to keyword matching, user profile 110, and dialog history. The context of a question or command determines the domain and thereby, the domain agent 156, if any, to be evoked. For example, a question with the keywords "temperature" implies a context value of weather for the question. The parser dynamically receives keyword and associated prior probability or fuzzy possibility updates from the system agent 150 or an already active domain agent 156. Based on these probabilities or possibilities the possible contexts are scored and the top one or few are used for further processing.

The parser 118 uses a scoring system to determine the most likely context or domain for a user's question and/or command. The score is determined from weighing a number of factors, which include the user profile 110, the domain agent's data content, and previous context. Based on this scoring, the system 90 invokes the correct agent. If the confidence level of the score is not high enough to ensure a reliable response, the system 90 may ask the user to verify whether the question and/or command is correctly understood.

In general, the question that is asked by the system 90 may be phrased to indicate the context of the question including all criteria or parameters. For example, the question can be in the form of: "Did I understand that you want such-and-such?" If the user confirms that the question is correct the system proceeds to produce a response. Otherwise, the user can rephrase the original question, perhaps adding additional information to remove ambiguity, or the system can ask one or more questions to attempt to resolve the ambiguity.

Once the context for the question or command has been determined, the parser 118 can invoke the correct agent 156, 150. To formulate a question or command in the regular grammar used by agents, the parser 118 may determine required and optional values for the criteria or parameters. These criteria may have been explicitly supplied by the user or may need to be inferred. The parser 118 may make use of the criteria handlers 152 supplied by the system agent 150. The criteria handlers 152 may provide context sensitive procedures for extracting the criteria or parameters from the user's questions or commands. Some criteria are determined by executing algorithms in the agent, while others may be determined by applying probabilistic of fuzzy reasoning to tables of possible values. Prior probabilities or fuzzy possibilities and associated values are received from a number of sources including the history of the dialog, the user profile 110, and the agent. Based on user responses, the prior probabilities or fuzzy possibilities are updated as the system learns the desired behavior. For a weather context, examples of criteria include, location, date and time. Other criteria can include command criteria (i.e., yes/no, on/off, pause, stop), and spelling. Special criteria handlers are available from the system agent for processing lists, tables, barge-in commands, long strings of text, and system commands.

The criteria handlers 152 operate iteratively or recursively on the criteria extracted to eliminate ambiguity. This processing helps reduce the ambiguity in the user's question or command. For example, if the user has a place name (or other proper noun) in their utterance, the parser 118 can use services of the domain agent 156 to look up tables in the databases 102 for place names or can attempt to determine which word is the proper noun from the syntax of the utterance. In another example, the user asks "what about flight one hundred and twenty too?" The parser and domain agent use flight information in the database and network information along with context to determine the most plausible interpretation among "flight one hundred and flight twenty also," "flight one hundred and flight twenty two," "flight one hundred and twenty two," and the like.

Once the context and the criteria are determined, the parser 118 may form the question or command in a standard format or hierarchical data structure used for processing by the agents 150, 156. The parser 118 may fill in all required and some optional tokens for the grammar of the context. Often the tokens must be transformed to values and forms acceptable to the agents. The parser obtains the required transformations from the agents, dialog history or user profile 110. Examples of transformations or substitutions performed by the parser on tokens include:

substituting a stock symbol for a company name or abbreviation;
substituting a numerical value for a word or words;
adding a zip code to an address; and
changing a place or other name to a commonly used standard abbreviation.

The agents 150, 156 may receive a command or question once the parser 118 has placed it in the required standard format. Based on the context, the parser 118 evokes the correct agent to process the question or command.

Commands can be directed to the system 90 or to an external entity. System commands are generally directed to the system agent 150. Commands for external entities are generally processed by a domain agent 156, which includes the command context and behavior for the external entity.

Specific questions are generally directed to one of the domain agents 156. Based on the question or context and the parameters or criteria, the domain agent creates one or more queries to one or more local or external information sources. Questions can be objective or subjective in nature. Results for objective questions can often be obtained by structured queries to one or more local or network information sources. Even for objective questions, the system 90 may need to apply probabilistic or fuzzy set analysis to deal with cases of conflicting information or incomplete information. Information to answer subjective questions is generally obtained by one or more ad-hoc queries to local or network data sources, followed by probabilistic or fuzzy set evaluation of the one results to determine a best answer.

Once the domain agent 156 has formulated the one or more queries, they may be sent to local and/or network information sources. The queries are performed in an asynchronous manner to account for the fact that sources respond at different speeds or may fail to respond at all. Duplicate queries are sent to different information sources to ensure that at least one source responds with a useful result in a timely manner. Further, if multiple results are received in a timely manner, they can be scored by the system to determine which data is most reliable or appropriate. Examples of data sources accommodated include, HTTP data sources, sources with meta-data in various formats including XML, entertainment audio, video and game files including MP3, databases using query languages and structured responses such as SQL, and other data sources.

The local information sources can be stored in one or more system databases 102 or can be on any local data storage such as a set of CDs or DVDs in a player or other local data storage. Network information sources can be connected to the Internet 136 or other network and accessed through a series of plug-ins or adaptors, known as pluggable sources, in the network interface 116. The pluggable sources in the network interface 116 may be capable of executing the protocols and interpreting the data formats for the data sources of interest. The pluggable sources may provide information, scraping data and procedures for each source to the domain agents 156. If a new type of data source is to be used, a new plug-in or adaptor can be added to the network interface 116.

The domain agent 156 evaluates the results of the one or more queries as they arrive. The domain agent 156 scores the relevance of the results based on results already received, the context, the criteria, the history of the dialog, the user profile 110 and domain specific information using probabilistic or fuzzy scoring techniques. Part of the dialog history is maintained in a context stack. The weight of each context for the scoring is based on the relevance of one context to another and the age of the contexts. Other scoring variables can be associated through the context stack. Contexts can also be exclusive, so that previous contexts have no weight in the scoring.

Based on the continuous scoring processes, the domain agent 156 may determine if a single best answer can be extracted. For most questions, the desired result has a set of tokens that must be found to formulate an answer. Once a value has been found for each of these tokens, the results are ready for presentation to the user. For example, for a question on weather, the tokens can include the date, day of week, predicted high temperature, predicted low temperature, chance of precipitation, expected cloud cover, expected type of precipitation and other tokens. Results processed in this manner include error messages. For subjective questions, this determination is made by determining a most likely answer or answers, extracted by matching of the results received. If no satisfactory answer can be inferred from the results of the query, the agent can do one of the following:

1. Ask the user for more information, typically through the speech interface, and based on the results obtained formulate new queries. This approach is applied when an irresolvable ambiguity arises in the formulation of a response.
2. Formulate new queries based on the results received from the first set of queries. This approach is typically applied in cases where the responses received do not contain all the required information. Information sources to query can be inferred from the results already obtained (i.e., links in an HTML document) or from other sources. Using this approach one or more sets of queries and responses can be chained without the need for action by the user.

3. Wait for additional queries to return results.

In any case, the domain agent 156 may continue to make requests and evaluate results until a satisfactory response is constructed. In doing so, the agent can start several overlapping query paths or threads of inquiry, typically mediated by the event manager 100. This technique, combined with the use of asynchronous queries from multiple data sources, provides the real-time response performance required for a natural interaction with the user.

The domain agent 156 may apply conditional scraping operations to each query response as it is received. The conditional scraping actions depend on the context, the criteria, user profile 110, and domain agent coding and data. For each token to be extracted, scraping criteria 152 may be created using the services of the system agent 150. The scraping criteria use format specific scraping methods including, tables, lists, text, and other scraping methods. One or more scraping criteria can be applied to a page or results set. Once additional results are received, the domain agent 156 can create new scraping criteria to apply to results already acquired. The conditional scraping process removes extraneous information, such as graphics, which need not be further processed or stored, improving system performance.

The domain agent 156 may strongly influence how the results are presented. For instance, once the domain agent 156 has created a satisfactory response to a question, the agent 156 may format that response for presentation. Typically, the domain agent 156 formats the response into the markup format used by the text to speech engine 124. The domain agent 156 may also format the result presentation using available format templates and based on the context, the criteria, and the user profile 110. Variable substitutions and transformations may be performed by the agent 156 to produce a response best understood and most natural to the user. Further, the order of presentation of tokens and the exact terminology used to create a more natural response to the user may be varied by the agent 156. The domain agent 156 may also select the presentation personality 108 to be used.

The domain agent 156 may select the presentation template, determine order of presentation for tokens and determine variable substitutions and transformations using probabilistic or fuzzy set decision methods. The template used to form the presentation can be from the domain agent itself or from the user profile 110. The user profile 110 can completely specify the presentation format or can be used to select and then modify an existing presentation format. Selection and formatting of presentation templates can also depend on the presentation personality modules 108. At the same time, the characteristics of the personality used for the response are dynamically determined using probabilities or fuzzy possibilities derived from the context, the criteria, the domain agent itself and the user profile 110.

The domain agent 156 may apply a number of transformations to the tokens before presentation to the user. These variable substitutions and transformations are derived from a number of sources including, domain information carried by the agent, the context, the token values, the criteria, the personality module 108 to be used, and the user profile 110. Examples of variable substitutions and transformations include:

substitution of words for numbers;
substitution of names for acronyms or symbols (i.e., trading symbols);
use of formatting information derived from the information sources (i.e., HTML tags);
nature of the response including, text, long text, list, table;
possible missing information or errors;
units for measurement (i.e., English or metric); and
preferred terminology from the user profile 110 or presentation personality 108.

The system 90, according to another embodiment of the invention, may provide special purpose presentation capabilities for long text strings, tables, lists and other large results sets. Domain agents 156 may use special formatting templates for such results. The system agent 150 may provide special criteria handlers 152 for presentation and user commands for large results sets. The presentation templates used by the domain agents 156 for large results sets typically include methods for summarizing the results and then allowing the user to query the result in more detail. For example, initially only short summaries such as headlines or key numbers are presented. The user can then query the results set further. The criteria handlers 152 provide users with the capability to browse large results sets. Commands provided by the criteria handlers 152 for large results sets include, stop, pause, skip, rewind, start, and forward.

Some information, in formats such as video, pictures and graphics, may be best presented in a displayed format. The domain agents 156 may apply suitable presentation templates in these cases and present the information through the graphical user interface 114. The system agent 150 provides special criteria handlers 152 for presentation and user commands for display presentation and control.

FIG. 3 illustrates a high level process 300 for receiving natural language speech-based queries and/or commands and generating a response according to an embodiment of the invention. The process 300 comprises of individual steps, several of which may be repetitive in order to accommodate partial failures. The process 300 may begin when a user's utterance is received and processed at 302. The user utterance may be a query and/or a command and may be of a natural language speech-based form. After receiving the natural language query and/or command, the query and/or command may be processed so that the data is in a more machine understandable format such as in a digital format. Once the utterance has been converted into an understandable format, the utterance may be processed so that at least an approximate meaning of the utterance can be determined at 304. This may be accomplished by, for example, the use of stored dictionaries, phrases, user profiles, domain agent data, and other data. Based on the approximate meaning of the utterance, one or more correctly formatted queries and/or commands may be generated.

A user created query and/or command may require that multiple requests and/or commands may be needed in order to generate the desired response or action. Further, depending upon the context in which the query and/or command has been submitted (e.g., who is the user, what is the subject the query and/or command directed to, at what time or location is the query and/or command being directed to, and other parameters used in defining the query and/or command), a specific format for the query and/or command may be required. For instance, each of the domain agents 156 may require that requests and/or commands be formatted in a specific manner. Thus at 306, one or more properly formatted queries and/or commands may be generated. Operations 304 and 306 may be repeated in order to obtain the correct interpretation of the user utterance and result in the desired response and/or action. Once the properly formatted queries and/or commands are generated, the appropriate action may be taken at 308. This may require that the properly formatted queries and/or commands be sent to specific domain agent [s], information source[s], device[s], or other appropriate destination[s] that can fulfill the requirements of the query and/or command. Once the appropriate action[s] have been executed, this event may be recorded to, for example, the user's profile, database and/or one or more agents at 310. Such data may be useful for future user inquires and commands. After the action[s] have been performed, a response, if need be, may be generated and forwarded to the user and/or third parties at 312.

In the case of a query for retrieving data, the response would contain the requested information. In the case of a command, the response may be a confirmation that a specific action[s] has been executed. The response may be in the form of a natural language format. The response may also be formatted to reflect a particular personality or tone to the response in order to make the response more "human." The response may be relayed to the user and/or third parties as an audio message and/or a visual message displayed on a user interface.

Figure 4A:
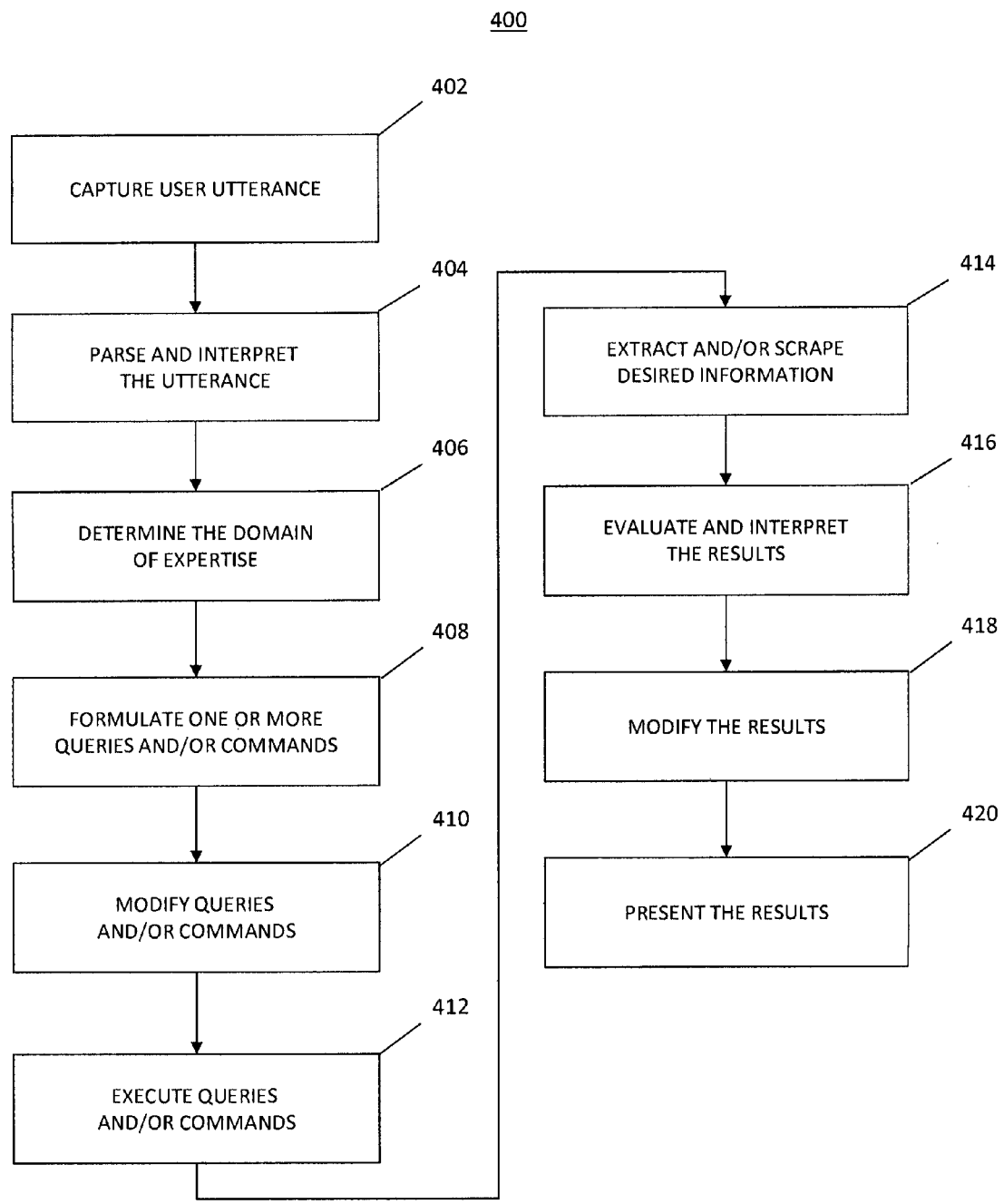
FIG. 4A is a process for receiving natural language speech-based queries and/or commands and generating a response according to one embodiment of the invention.

FIG. 4A illustrates an exemplary process 400 for receiving natural language speech-based requests and/or commands and generating a response using the system 90 according to another embodiment of the invention. The process 400 may begin when a user's utterance (i.e., user query and/or command) is captured using speech recognition that operates in a variety of real-world environments at 402. Once the utterance is captured, it is parsed and interpreted to determine the query and/or command contained in the utterance at 404. According to one embodiment of the invention, the utterance may be transcribed to text and analyzed using the general cognitive model 806, the environmental model 808, and/or the personalized cognitive model 810. Next, the request and/or command are reviewed to determine the domain of expertise required and the context of the query, invoking the proper resources including, for example, agents at 406. The original query and/or command submitted by the user may require that multiple queries and/or commands be generated.

For instance, suppose a user is interested in retrieving the value of her stock portfolio. The user may utter "please get the value of my stock portfolio." The system 90 may review this request together with stored data such as the user's profile, environmental model 808, and/or personalized cognitive model 810, to determine keywords such as "get the value" and "my stock portfolio." The system 90 may then generate requests to determine the stocks in the user's portfolio, the number of shares and the source for current pricing information. These queries may then be sent to one or more agent domains, such as a domain which may access a database containing the user's profile and a domain which accesses stock pricing sources to determine the answers to these questions.

Requests may be sent to these domain agents or sources in order to obtain the desired data. Thus, at operation 408, one or more requests may be formulated and sent to one or more local and/or network data sources and/or appropriate commands may be sent to local or remote devices or the system itself. The requests are then sent to the designated agent[s]. The agents may then, in turn, generate their own requests and/or commands to be sent to, for example, local or remote information sources to retrieve needed data. The agent generated requests and/or commands may be formatted according to the requirements of the target sources and variable substitutions and transformations are performed to modify the requests to a form most likely to yield desired results from the available sources at 410. Once the requests are formatted correctly, they may be executed in an asynchronous manner and dealing gracefully with failures at 412. As a result of the execution of the requests, results may be returned by the domain agents and/or sources. The system 90 may then extract or scrape the desired information from the one or more results, which may be returned in any one of a number of different formats at 414. That is, the results sought by a user may be the summary or the results of further processing of information obtained from several sources for example.

Next, the results may be evaluated and interpreted including processing of errors, and gathering and combining them into a single best result judged to be "best" even if the results are ambiguous, incomplete, or conflicting at 416. Once the best results are determined, any required formatting is performed. At operation 418, variable substitutions and transformations may be used to modify the results. Finally, at operation 420, the compound results may be presented to the user in a useful and expected manner through the text to speech engine 124. The process 400 may be performed while accounting for the domain of expertise required, the context in which the question or command is presented, the domain specific information available, the history of the user's interaction, the user preferences, the information sources or commands that are available, and responses obtained from the sources.

At each stage of process 400, probabilistic or fuzzy set decision and matching methods may be applied to deal with inconsistent, ambiguous, conflicting and incomplete information or responses. In addition, the use of asynchronous queries that may result in rapid and graceful failure of some queries or commands may allow the system 90 to robustly return results quickly and in a manner that seems natural to the user.

Figure 4B:
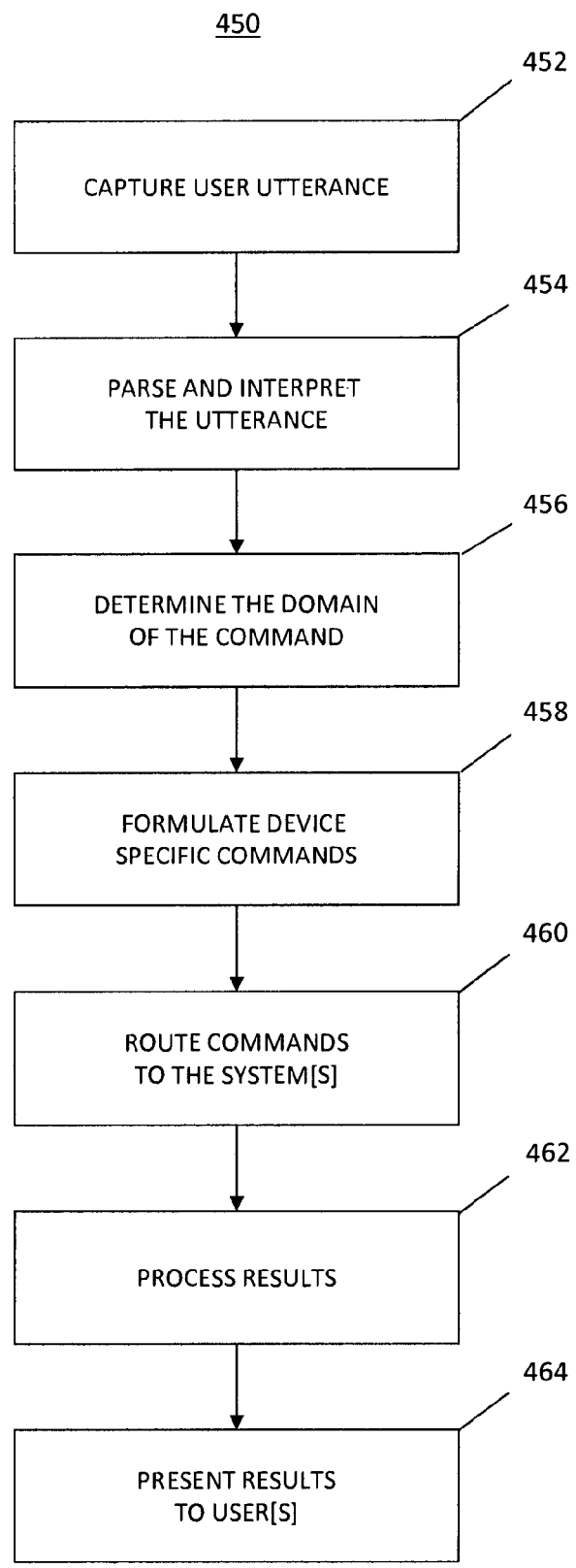
FIG. 4B is a process for receiving natural language speech-based commands in order to locally or remotely control functions of devices according to one embodiment of the invention.

FIG. 4B illustrates an exemplary process 450 for receiving natural language speech-based commands in order to locally or remotely control functions of the system 90, or for other devices, according to another embodiment of the invention. The process 450 may begin when a user's utterance (i.e., user query and/or command) is captured using speech recognition systems that operate in a variety of real-world environments at 452. Once the utterance is captured, it is parsed and interpreted to determine the command that is contained in the utterance at operation 454.

Next, at operation 456, the command is reviewed to determine the domain for the command and context and invoke the proper resources, including selecting of agents. The original command submitted by the user will often require that multiple queries and/or commands be generated. For instance, suppose a user is interested in recording his favorite television program. The user may utter "please record my favorite TV program." The system 90 may review this request together with stored data such as the user's profile and determine keywords such as "record" and "my favorite TV program." The system 90 may then generate queries to determine the name, the channel, and time for the user's favorite TV program. These queries may then be sent to a domain agent, which may access a database containing the user's profile and determine the answers to these questions. A command may then be sent to a video recorder ordering the video recorder to record the selected TV program. Thus, at operation 458, one or more queries may be formulated that are to be sent to one or more local and/or network data sources. Appropriate commands may be sent to local or remote devices or the system itself. Next, at operation 460, the generated commands may be routed to the appropriate system[s] and/or external devices. Once the commands have been executed, results including errors may be received and processed at 462. The results of the executed commands may be optionally presented to the user at operation 464.

Some of the operations depicting in FIG. 4A may be performed using multiple steps that may be repetitive. For instance, in operation 404, the user's utterance is parsed and interpreted in order to determine the meaning of the utterance. System 90 may make an initial interpretation of the utterance based on the data stored in, for example, the context description grammar module 112, user profiles 110, agents 106 and the databases 102. A real-time scoring system or other techniques may be applied to the interpretation results in order to generate a domain or a context score. If the confidence level of the domain or context score is not high enough to ensure a reliable response, the system 90 can request that the user verify the question or command is correctly understood. In general, the question may be phrased to indicate the context of the question including all criteria or parameters. If the user confirms that the question is correct, the system 90 may proceed to produce a response. Otherwise, either the user can rephrase the original question, perhaps adding additional information to remove ambiguity, or the system may ask one or more questions to attempt to resolve the ambiguity or other actions may taken.

FIG. 5 illustrates a process 500 for correctly interpreting a user's utterance according to one embodiment of the invention. The process 500 generally represents operations 402 and 404 of process 400. Initially the user's utterance is inputted into the system 90 at operation 502. The input is then interpreted at 504 using, for example, various sources of stored data such as user profiles, agent data, dictionary and phrases, and other relevant data. The interpretation is then scored using, for instance, a weighted scoring system as described previously at 506. Once a score is obtained, the confidence level of the interpretation may be analyzed to determine if it is satisfactory at operation 508. In other words, the determination relates to whether the score or confidence level given to the interpretation exceeds a certain value. If the confidence level is determined to be unsatisfactory, then a request may be submitted to the user requesting that the user verify the interpretation at 510 and 512. If the user is unsatisfied with the interpretation, he/she may be asked to rephrase the utterance and/or provide additional information at 514. Once the user provides the rephrased utterance and/or additional information, the process 500 returns to the beginning at operation 502. If, on the other hand, the user is satisfied with the interpretation, then the process 400 for receiving natural language speech-based requests and/or commands, and generating a response, may continue at operation 516. Once the meaning of the utterance has been determined, the appropriate domain agent[s] and the query and/or commands may be properly formatted for the agent[s].

Figure 6:
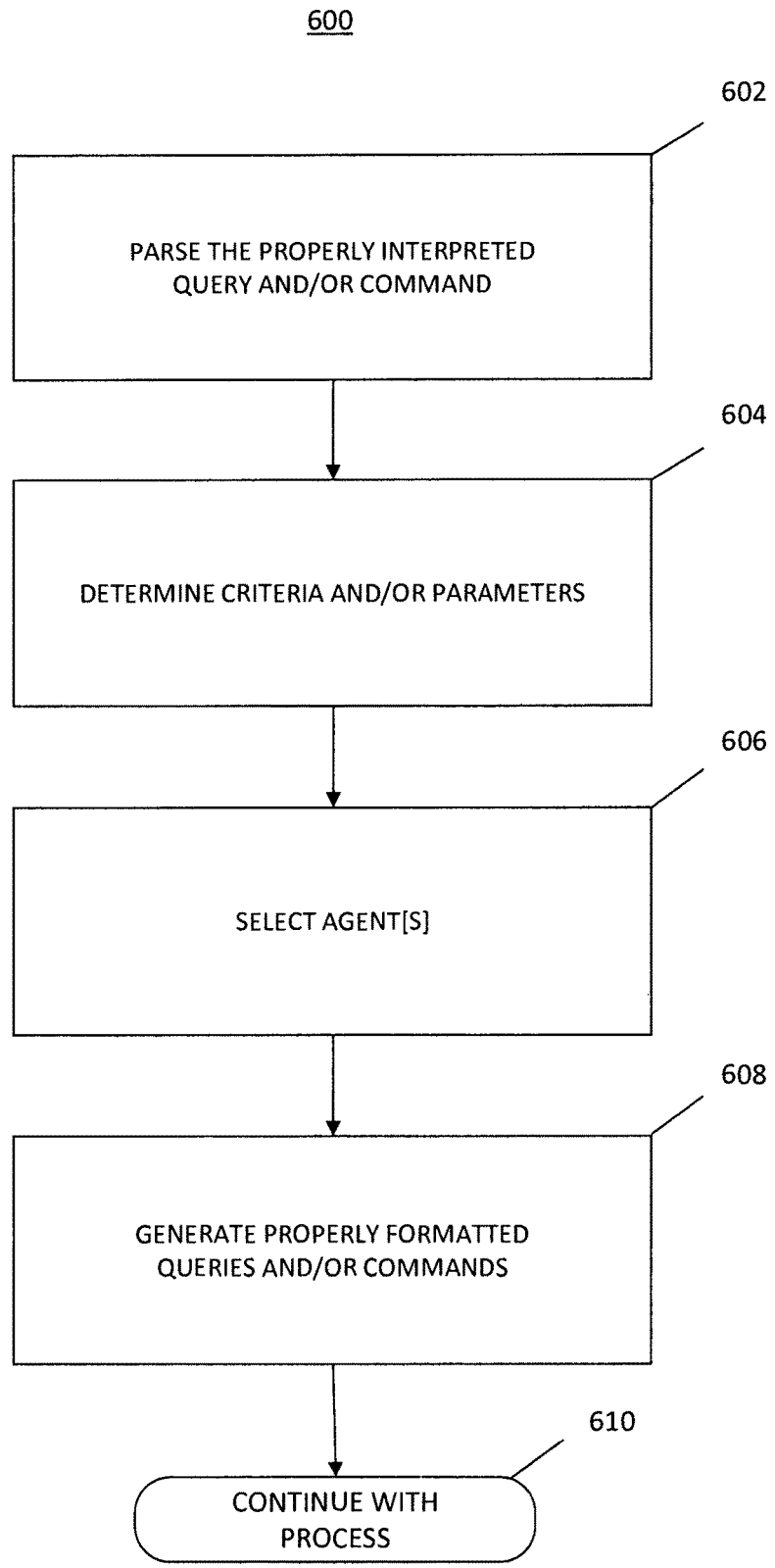
FIG. 6 is a process for determining the proper domain agents to invoke and the properly formatted queries and/or commands that is to be submitted to the agents according to one embodiment of the invention.

FIG. 6 illustrates a process 600 for determining the proper domain agent[s] to invoke and the proper format for queries and/or commands that are submitted to the agents 106, as generally depicted in steps 406-408 of FIG. 4A. In order to formulate a question or command in the regular grammar used by agents 106, a determination may be made as to the required and optional values for the criteria or parameters of the queries and/or commands. These criteria may have been explicitly supplied by the user or may need to be inferred.

Thus, the properly interpreted query and/or command that is generated by, for example, operations 404 and 454 of FIGS. 4A and 4B, is parsed at operation 602.

The content of the properly interpreted request and/or command is then analyzed to determine the criteria and/or parameters of the properly interpreted request and/or command at 604. A context sensitive procedure for extracting the criteria or parameters from the properly interpreted request and/or command may be used. Some criteria are determined by executing algorithms in the agent, while others may be determined by applying probabilistic of fuzzy reasoning to tables of possible values. Prior probabilities or fuzzy possibilities and associated values are received from a number of sources including the history of the dialog, the user profile 110, and the agent.

Based on user responses, the prior probabilities or fuzzy possibilities are updated as the system 90 learns the desired behavior. For a weather context, examples of criteria include, location, date and time. Other criteria can include command criteria (i.e., yes/no, on/off, pause, stop), and spelling. The process for determining criteria may be iterative or recursive in order to eliminate ambiguity in the user's question or command. For example, if the user has a place name (or other proper noun) in their utterance, tables in the databases 102 may be reviewed for place names or an attempt may be made to determine which word is the proper noun from the syntax of the utterance. In another example, the user asks "what about flight one hundred and twenty too?" In such a situation, flight information in the database and network information along with context may be used to determine the most plausible interpretation among "flight one hundred and flight twenty also," "flight one hundred and flight twenty two," "flight one hundred and twenty two," and the like. Once the parameters and criteria for the query and/or command have been established, the proper agents 106 may be selected at 606.

After selecting the agents 106, at operation 608, a properly formatted query and/or command that will be submitted to the agents 106 may be determined. The query and/or command may be in a standard format or may be a hierarchical data structure used for processing by the agent 106. In order to submit the properly formatted query and/or command to the agent 106, all of the required, and some optional tokens, for the grammar of the context may be filled in. Often the tokens must be transformed to values and forms acceptable to the agents. The required transformations may be obtained from the agents, dialog history or user profile 110. Examples of transformations or substitutions that may be performed were provided above. Once the properly formatted queries and/or commands are generated, the process (e.g., process 400) may continue at 610.

While specific embodiments of the invention have been described above, it will be appreciated that the invention may be practiced otherwise than as described. For example, the invention may take the form of a computer program containing one or more sequences of machine-readable instructions describing a method as disclosed above, or a data storage medium (e.g., semiconductor memory, magnetic or optical disk) having such a computer program stored therein.

The descriptions above are intended to be illustrative, not limiting. Thus, it will be apparent to one skilled in the art that modifications may be made to the invention as described without departing from the scope of the claims set out below.

What is claimed is:

1. A method of processing natural language command, the method being implemented by a computer system that comprises one or more physical processors executing one or more computer program instructions which, when executed, perform the method, the method comprising:
 receiving, by the computer system, a natural language command from a user;
 generating, by the computer system, a first interpretation of the natural language command based on one or more recognized words of the natural language command;
 performing, by the computer system, a first action specified by the natural language command based on the first interpretation;
 accessing, by the computer system, a personalized cognitive model to proactively select a second interpretation of the natural language command responsive to an indication from the user that the first interpretation is not correct; and
 proactively performing, by the computer system, a second action specified by the natural language command based on the second interpretation.

2. The method of claim 1, further comprising:
 receiving, by the computer system, a second natural language command from the user; and
 generating, by the computer system, one or more interpretations of the second natural language command,
 wherein proactively performing, by the computer system, a second action comprises performing the second action based on the one or more interpretations of the second natural language command.

3. The method of claim 1, further comprising:
 updating, by the computer system, the personalized cognitive model associated with the user based on the indication that the first interpretation is not correct,
 wherein proactively performing, by the computer system, the second action comprises performing the second action based on the updated personalized cognitive model.

4. The method of claim 1, further comprising:
 receiving, by the computer system, a user input associated with the user after the receipt of the natural language command,
 wherein the indication from the user that the first interpretation is not correct is based on a determination that the receipt of the user input is proximate in time to the receipt of the natural language command.

5. The method of claim 4, wherein the determination that the receipt of the user input is proximate in time to the receipt of the natural language command is based on a determination that the user input is received before a predetermined time.

6. The method of claim 4, wherein the user input includes a subsequent natural language command or a non-voice input.

7. The method of claim 1, further comprising:
 receiving, by the computer system, a user input associated with the user after the receipt of the natural language command; and
 determining, by the computer system, whether the receipt of the user input is proximate in time to the receipt of the natural language command; and
 determining, by the computer system, whether the first interpretation is correct, wherein determining whether the first interpretation is correct comprises: determining that the first interpretation is correct in response to a determination that the receipt of the user input is not proximate in time to the receipt of the natural language command; and determining that the first interpretation is not correct in response to a determination that the receipt of the user input is proximate in time to the receipt of the natural language command.

8. The method of claim 1, wherein the second action includes an action that is predicted to be requested or taken by the user after the receipt of the natural language command.

9. A system for processing natural language utterances, comprising:
 one or more physical processors programmed to execute one or more computer program instructions which, when executed, cause the one or more physical processors to:
 receive a natural language command associated with a user;
 generate a first interpretation of the natural language command based on one or more recognized words of the natural language command;
 perform a first action specified by the natural language command based on the first interpretation;
 access, by the computer system, a personalized cognitive model to proactively select a second interpretation of the natural language command responsive to an indication from the user that the first interpretation is not correct; and
 proactively perform a second action specified by the natural language command based on the second interpretation.

10. The system of claim 9, wherein the one or more physical processors are further caused to:
 receive a second natural language command associated with the user; and
 generate one or more interpretations of the second natural language command,
 perform the second action based on the one or more interpretations of the second natural language command.

11. The system of claim 9, wherein the one or more physical processors are further caused to:
 update the personalized cognitive model associated with the user based on the indication that the first interpretation is not correct,
 wherein proactively perform the second action based on the second interpretation comprises performing the second action based on the updated personalized cognitive model.

12. The system of claim 9, wherein the one or more physical processors are further caused to:
 receive a user input associated with the user after the receipt of the natural language command,
 wherein the indication from the user that the first interpretation is not correct is based on a determination that the receipt of the user input is proximate in time to the receipt of the natural language command.

13. The system of claim 12, wherein the determination that the receipt of the user input is proximate in time to the receipt of the natural language command is based on a determination that the user input is received before a predetermined time.

14. The system of claim 12, wherein the user input includes a subsequent natural language command or a non-voice input.

15. The system of claim 9, wherein the one or more physical processors are further caused to:
 receive a user input associated with the user after the receipt of the natural language command; and determine whether the receipt of the user input is proximate in time to the receipt of the natural language command; and determine whether the first interpretation is correct, wherein determine whether the interpretation is correct comprises: determine that the first interpretation is correct in response to a determination that the receipt of the user input is not proximate in time to the receipt of the natural language command; and determine that the first interpretation is not correct in response to a determination that the receipt of the user input is proximate in time to the receipt of the natural language command.

16. The system of claim 9, wherein the second action includes an action that is predicted to be requested or taken by the user after the receipt of the natural language command.

* * * * *